(12) United States Patent
Cam et al.

(10) Patent No.: US 6,671,758 B1
(45) Date of Patent: Dec. 30, 2003

(54) BUS INTERFACE FOR CELL AND/OR PACKET DATA TRANSFER

(75) Inventors: Richard Cam, Vancouver (CA); Winston Mok, Vancouver (CA); Jonathan Loewen, Port Moody (CA)

(73) Assignee: PMC-Sierra, Inc. (CA)

( * ) Notice: Subject to any disclaimer, the term of this patent is extended or adjusted under 35 U.S.C. 154(b) by 572 days.

(21) Appl. No.: 09/608,294

(22) Filed: Jun. 30, 2000

(51) Int. Cl.⁷ .............................................. G06F 13/00
(52) U.S. Cl. ................... 710/100; 710/305; 370/395.51
(58) Field of Search ................ 710/100, 305, 710/110, 109, 310, 29; 370/395.51, 474, 473

(56) References Cited

U.S. PATENT DOCUMENTS

| | | | |
|---|---|---|---|
| 5,129,072 A | | 7/1992 | Larner et al. |
| 5,758,089 A | | 5/1998 | Gentry et al. |
| 5,875,192 A | * | 2/1999 | Cam et al. ............... 370/395.7 |
| 5,889,778 A | * | 3/1999 | Huscroft et al. ........ 370/395.31 |
| 6,307,858 B1 | * | 10/2001 | Mizukoshi et al. ..... 370/395.71 |
| 6,345,052 B1 | * | 2/2002 | Tse et al. ................. 370/395.6 |
| 6,356,557 B1 | * | 3/2002 | Nichols et al. ............. 370/449 |
| 6,510,155 B1 | * | 1/2003 | Sudo ...................... 370/395.4 |

OTHER PUBLICATIONS

ATM Forum, UTOPIA Specification Level 1. Version 2.01. af–phy–0017.000. Mar., 1994.
ATM Forum, Utopia Level 2. Version 1.0 af–phy–0039.000. Jun., 1995.
SCI–PHY Saturn Compatible Interface Specification for PHY Layer and ATM Layer Devices, Level 2, Issue 3: Nov., 1995.
POS–PHY Saturn Compatible Packet Over SONET Interface Specification For Physical Layer Devices, Level 2, Issue 4: Jun., 1998.
POS–PHY Level 3: Saturn Compatible Interface for Packet Over SONET Physical Layer and Link Layer Devices (Level 3). Issue 3. Nov., 1998.

* cited by examiner

Primary Examiner—Sumati Lefkowitz
Assistant Examiner—X. Chung-Trans
(74) Attorney, Agent, or Firm—Hall, Priddy, Myers & Vande Sande

(57) ABSTRACT

This document discloses some technical details of a FIFO interface used for both cell and packet data transfer. This interface is suitable for a large number of ports. It operates at an overall throughput of 800 Mb/s for 16-bit wide data paths at 50 MHz, and 3.2 Gb/s for 32-bit wide data paths at 100 MHz. It is designed to have minimal compatibility issues with UTOPIA L2 and similar interfaces.

43 Claims, 18 Drawing Sheets

Fig. 3.9. Receive Interface: Basic Operation.

BUS INTERFACE FOR CELL AND/OR PACKET DATA TRANSFER

FIELD

This invention relates generally to a bus interface used for both cell and packet data transfer. More specifically, this invention relates to a bus interface for data transfer between a master and one or more slave devices and is capable of accommodating a large number of ports.

BACKGROUND OF THE INVENTION

In conventional data communication systems, data is transferred over a bus connecting constituent component devices. Existing bus standards such as UTOPIA Levels 1 and 2 are used for ATM cell transfer, in either direction, between one or more Physical Layer (PHY or slaves) devices and an ATM Layer (Link Layer Processing or master) device. The UTOPIA Level 1 bus standard was designed for data transfer between one PHY device and an ATM Layer device. The UTOPIA Level 2 bus standard is an extension of UTOPIA Level 1 that supports data transfer between multiple PHY devices and an ATM Layer device. SCI-PHY is a PMC-Sierra proprietary bus interface similar to UTOPIA Level 2. POS-PHY Level 2 is also a PMC-Sierra proprietary bus interface similar to UTOPIA Level 2, but adapted for variable-length packet transfer.

In all of the UTOPIA-style bus standards described above, the Layer device (master) is the bus master, which controls data transfer to and from the PHY device or devices. On the transmit interface (Layer-to-PHY data transfer) of the bus, the Layer device polls the PHY device before sending data to the PHY device. The polled PHY device responds with a status signal to indicate if the FIFO queue of the PHY device has sufficient space to accept the data. Data transfer proceeds once the Layer device determines that the PHY device can accept the data.

On the receive interface (PHY-to-Layer data transfer) of the bus, the Layer device will poll the PHY devices to determine which PHY devices have data waiting to be transferred. The Layer device will select a waiting PHY device, which then transfers the data to the Layer device.

Direct status indication may also be used instead of polling on the transmit and receive interfaces. With direct status indication, FIFO queue status information is communicated directly between the Layer device and the attached PHY device. While this scheme is simpler than polling, it requires dedicated signal lines between each PHY port and the Layer device.

Polling and direct status indication on the transmit and receive interfaces prove unsuitable for applications that require a large number of PHY device ports. As the number of PHY ports increases, the task of adequately polling individual ports becomes increasingly difficult and becomes impossible after a certain point. The requirement of dedicated signal lines for direct status indication makes it suitable for interfaces with a small number of PHY ports.

The existing interfaces also suffer from the limitation that at high bus clock rates the single-cycle decode-response timing requirements of the existing UTOPIA-style interfaces may not be met.

On the receive interface, a PHY device may begin a data transfer at the point when it is being deselected by the Layer device. This complicates the implementation of the Layer device as it must recover from this race condition and reselect the PHY.

On the transmit interface, polling and selection are coupled in the existing UTOPIA-style interfaces.

The existing interfaces also do not adequately handle a PHY device that employs an edge FIFO shared among its constituent ports. The edge FIFO for the transmit interface may become momentarily congested by a stream of short packets (or short remaining tail fragments of packets). The current interfaces do not allow the PHY device to backpressure the Layer device during these conditions by a supplemental mechanism to polling. A supplemental mechanism would allow polling information to reflect internal per-port buffer status independently from transient congestion conditions. On the receive interface, the edge FIFO may introduce additional latency between the time a PHY device is selected and when it can begin transferring data. These timing requirements and assumptions are not explicitly considered in the existing interfaces.

The existing bus interfaces lack a mechanism for integrating PHY devices with different address widths and different numbers of ports through the same bus interface.

Many multi-service applications require both cell and packet transfer over a common bus interface. Packet is used to indicate a data block of variable length whereas a cell is a data block with a fixed length. In general, a cell will have 48 bytes of data and 5 bytes for a header. The existing interfaces address either cell or packet transfer only and have not implemented combined cell and packet transfer within a unified framework.

It is, therefore, an object of this invention to provide an improved bus interface that can handle both cells and packets.

It is a further object of this invention to provide a bus interface that adequately handles PHY devices that employ an edge FIFO queue.

It is still a further object of this invention to provide a bus interface that can support a large number of logical ports and slave devices with different numbers of ports.

It is still a further object of this invention to provide a bus interface where polling operates independently from PHY selection.

SUMMARY OF THE INVENTION

These and other objects of the invention are provided in a new and improved bus interface. In general, the bus interface will be used in conjunction with one Link Layer Device and one or more PHY devices. A PHY device is a circuit that contains one or more logical PHY ports. The use of the term PHY without referring specifically to a PHY device or a PHY port means that the context applies to both PHY devices and PHY ports. The system is arranged such that the Link Layer device is connected to one side of the bus interface and the one or more PHY devices are connected to the other side of the bus interface. The Link Layer device is responsible for coordinating the transfer of data.

In operation, three processes are implemented through the bus interface: polling, selection and data transfer.

Polling

At each clock cycle, the Link Layer device polls a PHY port by presenting a PHY address over the address lines of the transmit and receive interfaces. The polled device responds two clock cycles later to indicate if a data transfer can take place. On the transmit interface, the polled PHY device asserts the packet available status if it can accept data of at least a minimum block size from the Link Layer device. On the receive interface, the polled PHY device asserts the packet available status if it has a block of data to send to the Link Layer device. For both the transmit and receive interfaces, the maximum block size that may be transferred depends on the application. For example, the maximum block size for ATM cells may be 52-bytes (excluding the header error control byte) while the maximum block size for packet fragments may be 256 bytes. The maximum block size is fixed at start-up, either inherently in the Link Layer and PHY-devices, or by programming through an external management interface.

On either the transmit or receive interface, the poll response from a PHY that is not currently selected refers to the packet available status of the PHY device if it were to be selected at the next transfer period. On the transmit interface, the packet available status of a currently selected PHY device, in response to a poll coincident with any other cycle after the start of a transfer within the current transfer period, refers to the packet available status for the next transfer period. On the receive interface, the packet available status of a currently selected PHY refers to the next transfer period if it is coincident with the start of a transfer or any other cycle thereafter within the current transfer period. In any case, the polled PHY returns a negative response if the packet available status is uncertain.

Selection

The transmit interface utilizes in-band PHY selection. This method involves the Link Layer device prepending the selected PHY port address to the transmitted data block, thereby decoupling polling from selection.

On the receive interface, the Link Layer device selects a PHY by placing the corresponding PHY address on the receive address line during the last cycle that the receive enable signal is high. The selected PHY may begin a block transfer anytime within the start window. The start window is from two through to a maximum number of cycles, inclusive, calculated after the receive enable signal goes low. The use of a start window gives a margin of flexibility for the PHY to respond with the block transfer after being selected. The address of the selected PHY port or PHY device, is sent at the beginning of the transfer period. At the end of the transfer period, the selected PHY deselects itself. Only one PHY can be selected at a time. If a PHY does not initiate block transfer within the start window as defined above, the PHY deselects itself until explicitly selected again by the Link Layer device.

A data transfer over the receive interface can be arbitrarily paused by the Link Layer device by holding the receive enable signal high. When the PHY device detects that the receive enable signal is high, two cycles later, the PHY device pauses the data transfer. The data transfer is resumed two cycles after the PHY device detects that the receive enable signal is low. The Link Layer device does not need to explicitly reselect the PHY before resuming the data transfer. However, the Link Layer device must ensure that another PHY has not been inadvertently selected.

If there are a large number of ports, then per-device polling and selection can be used. In this scheme, the PHY device acts as a proxy. If at least one of the constituent ports of the PHY device is ready to send a block of data, then the PHY device asserts the receive packet available signal. When the PHY device is selected, it prepends the address of the selected port to the data block. Per-device polling and selection and per-port polling and selection can co-exist in the same interface.

Data Transfer

Data is transferred to and from the PHY device in bursts referred to as block transfer periods. A block transfer period has a minimum length of 2 cycles and a maximum length that is set on start-up. In ATM applications, the maximum length of a transfer is typically set to the length of an ATM cell, including extensions for prepends and postpends. A transfer period ends when the end of a packet is reached or when the maximum transfer length has been reached. Cycles during which a transfer is paused do not count towards the maximum transfer limit. The selected PHY is deselected by default at the end of its transfer period.

To manage the situation where a PHY's packet overhead processing capability has been exceeded, the selected PHY device can pause an on-going packet transfer from the Link Layer device. To accomplish this, a transmit ready signal is used. The transmit ready signal is held low to pause the transfer. The Link Layer device pauses two cycles after detecting a low transfer ready signal and resumes transmission two cycles after detecting a high transmit ready signal.

Alternatives to using a transfer ready signal include, a minimum gap between block transfers and timeout values.

Start of packet and end of packet signals are used on the transmit and receive interfaces to indicate the start and end of a packet, respectively. An error signal and a parity signal are also included in the transmit and receive interfaces.

Other objects and advantages of the invention will become clear from the following detailed description of the preferred embodiment, which is presented by way of illustration only and without limiting the scope of the invention to the details thereof.

BRIEF DESCRIPTION OF THE DRAWINGS

Many objects and advantages of the present invention will be apparent to those of ordinary skill in the art when this specification is read in conjunction with the attached drawings wherein like reference numerals are applied to like elements and wherein:

FIG. 4 is a timing diagram depicting sample timing for polling when the Transfer Packet Available (TPA) or Receive Packet Available (RPA) lines are shared among several PHY devices;

FIG. 5 is a timing diagram depicting sample timing for back-to-back polling when the Transfer Packet Available (TPA) and Receive Packet Available (RPA) lines are not shared among several PHY devices;

FIG. 6 is a timing diagram depicting sample timing for parallel polling when there are multiple Transfer Packet Available (TPA) and Receive Packet Available (RPA) lines;

DETAILED DESCRIPTION

Conventions

The following convention will be used throughout the detailed description.

A PHY device is a circuit that contains one or more logical PHY ports. The use of the term PHY without referring specifically to a PHY device or a PHY port means that the context applies to both PHY devices and PHY ports.

Signal labels will generally be prefixed with a T or an R to indicate transmit or receive (e.g., TEOP, REOP), respectively. A label used without a prefix (e.g., EOP) indicates the context applies to both the transmit and receive interfaces.

For the signal labels of the PHY device, an active-low signal is indicated by a "B" suffix:

SIGNAL active-high

SIGNALB active-low

The PHY bus interface of this invention may generally be referred to as Any-PHY.

General Topology

Figure 1:
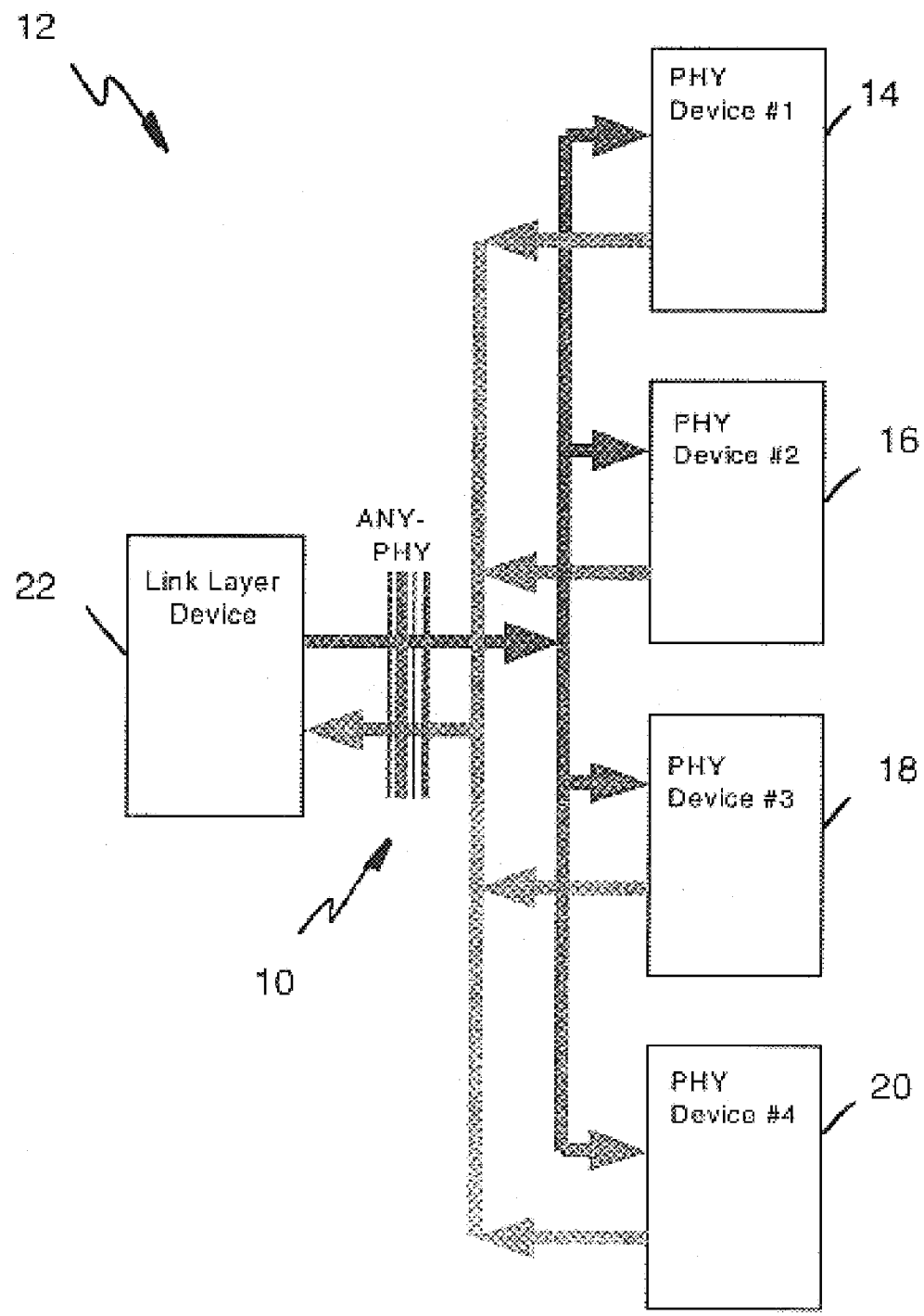
FIG. 1 is a schematic block diagram depicting a point-to-multipoint topology.
Figure 2:
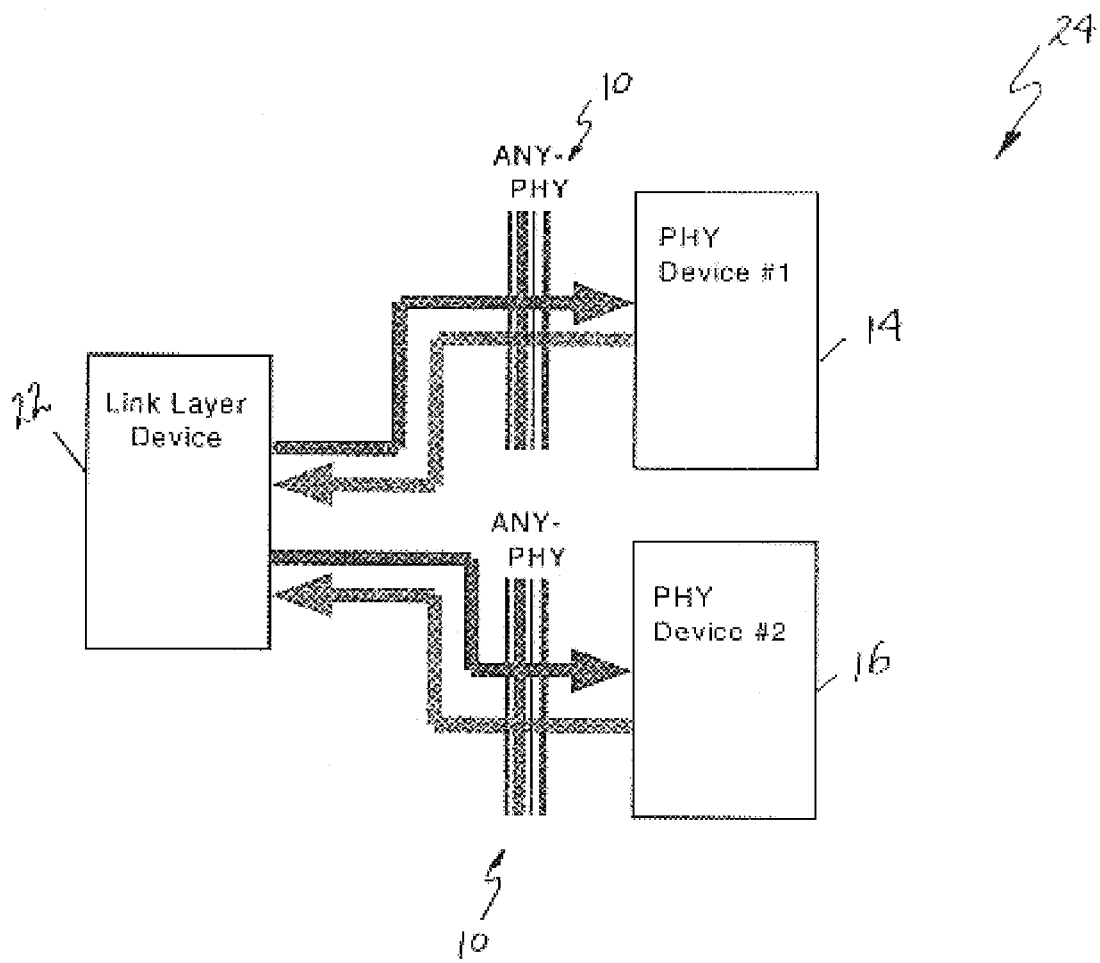
FIG. 2 is a schematic block diagram depicting a point-to-point topology.

Referring to FIG. 1, the PHY bus interface 10 may be embodied in a point-to-multipoint topology 12 that comprises communication between the Link Layer Device 22 and PHY devices 14, 16, 18 and 20 over a common PHY bus interface 10. Device I/O and (board-level) interconnect technologies will impose practical limits on the clock rate and the number of PHY devices that can be connected together in the point-to-multipoint topology 12. Therefore, referring to FIG. 2, the PHY bus interface 10 may also be embodied in a point-to-point topology 24 that comprises communication between the Link Layer Device 22 and PHY devices 14 and 16 over exclusive PHY bus interfaces 10. The point-to-multipoint topology is generally considered feasible up to interface clock rates not appreciably greater than 50 MHz. At clock rates in the neighborhood of 100 MHz and higher, the point-to-point topology may be the only readily realizable option at the present time.

Signals

Figure 3:
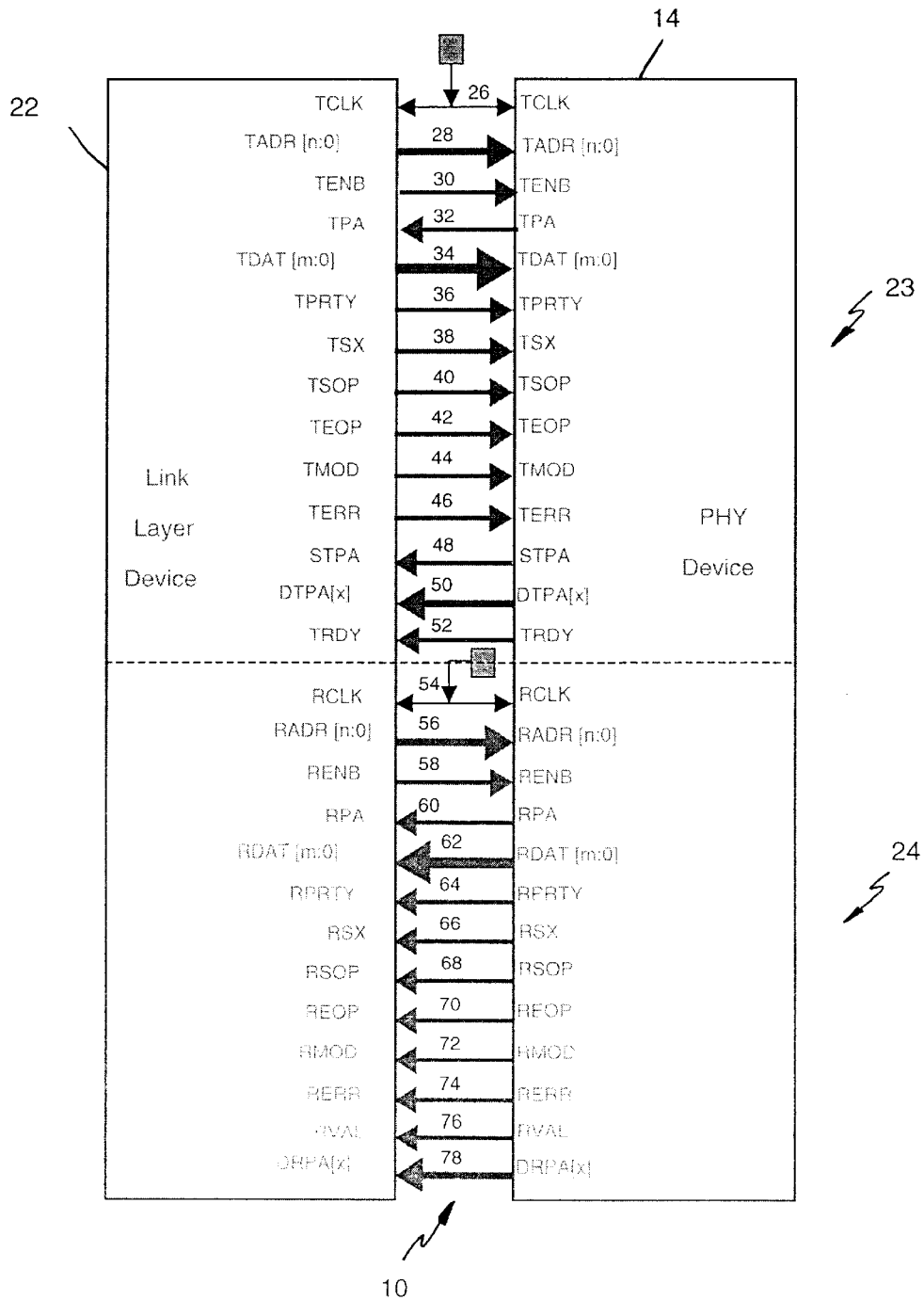
FIG. 3 is a schematic block diagram depicting the transmit and receive interfaces of a PHY device and a Link Layer Device.

Referring to FIG. 3, a block diagram depicting the signals of the PHY bus interface 10 is shown. The descriptions for the signals of the transmit interface 23 and the receive interface 25 are given in Tables 1 and 2 respectively.

TABLE 1

Any-PHY Transmit Interface Signal Summary.

| Signal | Direction | Description |
|---|---|---|
| TCLK | Clock Source to Link and PHY | Transmit Clock. |
| TADR [n:0] | Link to PHY | Transmit Address. The value of n is the desired address range. The Link Layer Device polls a PHY by placing the PHY's address on TADR. The polled PHY responds two cycles later by asserting TPA. The address value of all 1's is reserved for the NULL address. None of the PHYs respond to a NULL address. |
| TCSB | Link to PHY | Transmit Chip Select. When the TxCS_enabled start-up parameter is set to 1, TADR[n] functions as an active-low transmit interface chip select (TCSB) signal on a PHY device. TCSB may be sourced either directly by the Link Layer device or indirectly through TADR and external decode logic. The value(s) of TCSB at the PHY device(s) are indicated one cycle after the corresponding TADR value. When TCSB = 0, the PHY device is selected and TADR[n-1:0] is used to select a constituent logical PHY port of the selected device. When TCSB = 1, the PHY device is not selected. |
| TENB | Link to PHY | Transmit Enable. When used to pause a block transfer, TENB is low during cycles in which TDAT[m:0] contains valid data and control/status indication within a given block transfer period, except for cycles containing address prepends, in which case TENB is high. For inter-operation with Utopia and POS-PHY Level 2, the Link Layer device may indicate a pause in data transfer at any time within a transfer period by holding TENB high. TENB is high between block transfer periods. When TENB is used for PHY selection (Utopia/Pos-PHY Level 2), the Link Layer device selects a PHY by placing its address on TADR at the last cycle before TENB transitions low. |
| TPA | PHY to Link | Transmit Packet Available. Tri-state signal. TPA is asserted for one cycle by the polled PHY two cycles after its corresponding address has been placed on TADR. The polled PHY asserts TPA high if it can receive at least MaxTransfer bytes of data from the Link Layer device. It asserts TPA low otherwise. Multiple TPA signal inputs at the Link Layer device, one per PHY device, can be used to support parallel polling of multiple PHY devices. |
| TDAT [m:0] | Link to PHY | Transmit Data. Carries data from the Link Layer device to a PHY device. The value of m is set such that m = 7 and 15 for 8 and 16 bit wide data paths, respectively. The payload data in each transfer period may be encapsulated by control/status information. In the transmit direction, a prepended port address is sent at the beginning of a transfer period. The number of bits occupied by the prepended port address is defined by PHYAddrLen and is set at start-up. |
| TPRTY | Link to PHY | Transmit Parity. Used for error detection on TDAT[m:0] For each cycle in which TDAT is valid (including |

TABLE 1-continued

Any-PHY Transmit Interface Signal Summary.

| Signal | Direction | Description |
|---|---|---|
| | | the address prepend cycle, and cycles during which a transfer is paused), the value of TPRTY is set such that the total number of 1's in TDAT and TPRTY is either even or odd. If implemented, Any-PHY interfaces are only required to support odd parity. |
| TSX | Link to PHY | Transmit Start of Transfer. Indicates the first cycle of a transfer period. TSX is high during the first cycle of the transfer period and held low otherwise. |
| TSOP | Link to PHY | Transmit Start of Packet. Used for POS-PHY and Utopia L2 PHY devices to mark the cycle containing the start of a packet or cell. TSOP is high at the cycle in a transfer period containing the start of a packet and held low otherwise. |
| TEOP | Link to PHY | Transmit End of Packet. Marks the cycle containing the end of a packet in the payload data. TEOP is high at the cycle containing the end of a packet and held low otherwise. |
| TMOD | Link to PHY | Transmit Word "Modulus". Used in packet transfers to indicate the position of the last valid byte in a multi-byte word at the end of a packet. TMOD is not defined for 8-bit wide data paths. When used for a 16-bit data path, TMOD is high if the packet ends on the high-order byte of the last transmitted word. TMOD is low otherwise. The values of TMOD at the cycle when a packet ends are summarized as follows:<br>    TMOD = "0"    TDAT[15:0] valid<br>    TMOD = "1"    TDAT[15:8] valid.<br>When used for a 32-bit data path, TMOD is a 2-bit signal which takes on the following values at the cycle when a packet ends:<br>    TMOD[1:0] = "1 1"    TDAT[31:24] valid<br>    TMOD[1:0] = "1 0"    TDAT[31:16] valid<br>    TMOD[1:0] = "0 1"    TDAT[31:8] valid<br>    TMOD[1:0] = "0 0"    TDAT[31:0] valid.<br>TMOD[1:0] is held at "0 0" otherwise. |
| TERR | Link to PHY | Transmit Error. During a transfer period, at the cycle containing an end of packet, TERR is asserted high to indicate an error condition and held low otherwise. If TERR is high, the Link Layer device may optionally insert status information by overwriting the least significant byte of TDAT[m:0] on the cycle containing the end of packet. On startup, the Link Layer and PHY device must be set to the same mode with the overwrite either enabled or disabled. |
| TRDY | PHY to Link | Transmit Ready. A tri-state signal driven by the selected PHY to pause data transfer on the transmit interface. The Link Layer device samples TRDY two cycles after asserting TSX high. If TRDY is sampled low, it must pause transmission two cycles later, and it shall resume transmission no earlier than the second cycle after sampling TRDY high. Moreover, the Link Layer device shall not initiate a new transfer period earlier than the second cycle after TRDY is asserted high. |
| DTPA | PHY to Link | Direct Transmit Packet Available Individual per-port signal used for byte-level transfer in POS-PHY. |
| STPA | PHY to Link | Selected-PHY Transmit Packet Available. A tri-state signal. Asserted by the selected PHY port for byte-level transfer in POS-PHY. |

TABLE 2

Any-PHY Receive Interface Signal Summary.

| Signal | Direction | Description |
|---|---|---|
| RCLK | Clock Source to Link and PHY | Receive clock. |
| RADR [n:0] | Link to PHY | Receive Address. The value of n is the desired address range. The Link Layer Device polls a PHY by placing the PHY's address on RADR. The polled PHY responds two cycles later by asserting RPA. RADR is also used, with RENB, for PHY selection. Polling and selection operate simultaneously, such that a PHY that is being selected is also being polled. The address value of all 1's is reserved for the NULL address. None of the PHYs respond to a NULL address. |
| RCSB | Link to PHY | Receive Chip Select. When the RxCS_enabled start-up parameter is set to 1, RADR[n] functions as an active-low receive interface chip select (RCSB) signal on a PHY device. RCSB may be sourced either directly by the Link Layer device or indirectly through RADR and external decode logic. The value(s) of RCSB at the PHY device(s) are indicated one cycle after the corresponding RADR value. When RCSB = 0, the PHY device is selected (for either polling or data transfer) and RADR[n-1:0] is used to select a constituent logical PHY port of the selected device. When RCSB = 1, the PHY device is not selected. |
| RENB | Link to PHY | Receive Enable. Used for PHY selection and for pausing data transfer from a selected PHY device. A PHY is selected by placing its address on RADR at the last cycle that RENB is high. The selected PHY transfers data at the second cycle or later after sampling RENB low. Data transfer is paused two cycles after RENB is sampled high. Data transfer resumes on the second cycle after RENB is sampled low again. |
| RPA | PHY to Link | Receive Packet Available. Tri-state signal. RPA is asserted for one cycle by the polled PHY two cycles after its address has been output on the bus (via RADR). The polled PHY asserts RPA high if it has either at least MaxTransfer bytes of data or a data fragment containing an end of packet to send to the Link Layer device. RPA is asserted low otherwise. Multiple RPA signal inputs at the Link Layer device (one per PHY device) support parallel polling of multiple PHY devices. |

TABLE 2-continued

Any-PHY Receive Interface Signal Summary.

| Signal | Direction | Description |
|---|---|---|
| RDAT [m:0] | PHY to Link | Receive Data.<br>Tri-state signal. Carries data from a PHY to the Link Layer device. The value of m is set such that m = 7 and 15, for 8 and 16 -bit wide data paths respectively. The payload data in each transfer period may be encapsulated by control/status information. When per-device polling is used in the receive direction, a prepended port address is sent at the beginning of a transfer period. The number of bits occupied by the address prepend is defined by PHYAddrLen and is set at start-up. |
| RPRTY | PHY to Link | Receive Parity.<br>Tri-state signal. Used for error detection on RDAT[m:0]. For each cycle in which RDAT is valid (including the address prepend cycle, and cycles during which a transfer is paused), the value of RPRTY is set such that the total number of 1's in RDAT and RPRTY is either even or odd. If implemented, Any-PHY interfaces are only required to support odd parity. Tri-stated when RDAT[m:0] are tri-stated. |
| RSX | PHY to Link | Receive Start of Transfer.<br>Tri-state signal. Indicates the first cycle of a transfer period. RSX is high at the first cycle of a transfer period, held low for the remainder of the transfer period and then tri-states atterwards. |
| RSOP | PHY to Link | Receive Start of Packet.<br>Tri-state signal. Used for POS-PHY or Utopia L2 PHY devices to mark the cycle containing the start of a packet or cell. The selected PHY outputs RSOP high at the cycle in a transfer period containing the start of a packet, held low otherwise during the transfer period and then tri-states afterwards. |
| REOP | PHY to Link | Receive End of Packet.<br>Tri-state signal. Used to mark the cycle containing the end of a packet. The selected PHY outputs REOP high at the cycle containing the end of a packet. REOP is held low otherwise and then tri-stated, respectively, during and after the end of the transfer period. |
| RMOD | PHY to Link | Receive Word "Modulus".<br>Tri-state signal. Used in packet transfers to indicate the position of the last valid byte in a multi-byte word at the end of a packet. RMOD is tri-stated at the end of a transfer period and is not defined for 8-bit wide data paths. When used for a 16-bit data path, the selected PHY outputs RMOD high if the packet ends on the high-order byte of the last transmitted word and held low otherwise. The values of RMOD are summarized as follows:<br>    RMOD = "0"    RDAT[15:0] valid<br>    RMOD = "1"    RDAT[15:8] valid.<br>When used for a 32-bit data path, RMOD is a 2-bit signal which takes on the following values at the cycle when a packet ends:<br>    RMOD[1:0] = "1 1"    RDAT[31:24] valid<br>    RMOD[1:0] = "1 0"    RDAT[31:16] valid<br>    RMOD[1:0] = "0 1"    RDAT[31:8] valid<br>    RMOD[1:0] = "0 0"    RDAT[31:0] valid.<br>RMOD[1:0] is held at "0 0" otherwise. |
| RERR | PHY to Link | Receive Error.<br>Tri-state signal. During the transfer period, at the cycle containing an end of packet, RERR is asserted high to indicate an error condition and held low otherwise. RERR is tri-stated at the end of the transfer period. When RERR is high, the PHY device may optionally overwrite the least significant byte of RDAT[m:0] on the cycle containing the end of packet. The Link Layer and PHY device must be set to the same mode with the overwrite either enabled or disabled. |
| DRPA | PHY to Link | Direct Receive Packet Available.<br>Individual per-port signal used in POS-PHY byte-level transfer mode. |
| RVAL | PHY to Link | Receive Data Valid.<br>Used in POS-PHY interfaces. In POS-PHY Level 2, the selected PHY outputs RVAL low to either pause its transfer or on end of packet. The selected PHY will tri-state RVAL one cycle after sampling RENB high while RADR[n:0] differs from the selected PHY's address. Once a PHY has output RVAL low, it must be reselected before it can output RVAL high again. |

Table 3 indicates the default logic levels for tristate signals of the transmit and receive interfaces.

TABLE 3

Default Logic Levels for Tristate Signals.

| Signal | Default Logic Level While Tristated (N/A = not applicable) |
|---|---|
| TPA | N/A |
| TRDY | High |
| STPA | N/A |
| RPA | N/A |
| RDAT | N/A |
| RPRTY | N/A |
| RSX | Low |
| RSOP | Low |
| REOP | Low |
| RMOD | Low |
| RERR | Low |
| RVAL | Low |

SCI-PHY, POS-PHY and Any-PHY signals are cross-referenced in Tables 4 and 5, respectively, for the transmit and receive interfaces.

TABLE 4

Any-PHY Signal Cross-Reference (Transmit Interface).

| Description | ANY-PHY | Utopia (* = ACTIVE LOW) | POS-PHY | SCI-PHY |
|---|---|---|---|---|
| Clock | TCLK | TxClk | TFCLK | TFCLK |
| Address | TADR | TxAddr | TADR | TADDR |
| Chip Select | TCSB | | | |
| Enable | TENB | TxEnb* | TENB | TWRENB |
| Cell/Packet Available | TPA | TxClav | TPA | TCA |
| Data | TDAT | TxData | TDAT | TDAT |
| Parity | TPRTY | TxPrty | TPRTY | TXPRTY |
| Start of Transfer | TSX | | | |
| Start of Cell/ Packet | TSOP | TxSOC | TSOP | TSOC |
| End of Packet | TEOP | | TEOP | |
| Word Modulus | TMOD | | TMOD | |
| Error Indication | TERR | | TERR | |
| Device Ready | TRDY | | | |
| Address Valid | | | | TAVALID |
| Direct Status Packet Available | DTPA | | DTPA | |
| Selected PHY Packet Available | STPA | | STPA | |

TABLE 5

Any-PHY Signal Cross-Reference (Receive Interface)

| Description | ANY-PHY | Utopia (* = ACTIVE LOW) | POS-PHY | SCI-PHY |
|---|---|---|---|---|
| Clock | RCLK | RxClk | RFCLK | RFCLK |
| Address | RADR | RxAddr | RADR | RADDR |
| Chip Select | RCSB | | | |
| Enable | RENB | RxEnb* | RENB | RRDENB |
| Cell/Packet Available | RPA | RxClav | RPA | RCA |
| Data | RDAT | RxData | RDAT | RDAT |
| Parity | RPRTY | RxPrty | RPRTY | RXPRTY |
| Start of Transfer | RSX | | | |
| Start of Cell/ Packet | RSOP | RxSOC | RSOP | RSOC |
| End of Packet | REOP | | REOP | |
| Word Modulus | RMOD | | RMOD | |
| Error Indication | RERR | | RERR | |
| Direct Status Packet Available | DRPA | | DRPA | |
| Address Valid | | | | RAVALID |
| Data Valid | RVAL | | RVAL | |

Operation

If implemented, TADR[n] and RADR[n] on a PHY device may function as transmit and receive interface chip-select signals (TCSB and RCSB) respectively, depending on the value of start-up parameters TxCS_enabled and RxCS_enabled. If ADR[n] functions as a chip-select signal (CSB), the corresponding (transmit/receive) interface of the PHY device is selected (for polling or data transfer) when CSB=0 and ADR[n−1:0] contains a matching valid port address. Any address value in ADR[n−1:0] may be used to identify an internal port (when CSB=0, all ones on ADR[n−1:0] is not a NULL address). When CSB=1, the corresponding interface of the PHY device is not selected, regardless of the value contained in ADR[n−1:0]. Regardless of whether or not chip select is enabled, a PHY device shall not respond to a NULL address (all ones over ADR[n:0]).

Polling

For each clock cycle of the TCLK 26 and the RCLK 54, the Link Layer device 22 polls a PHY device by presenting a PHY address over the address lines TADR[n:0] 28 and RADR[n:0] 56 respectively. The polled PHY device responds over the TPA 32 and RPA 60 lines, two clock cycles after being polled to indicate whether a data transfer can take place. On the transmit interface 23, the polled PHY device asserts TPA 32 if it can accept a block of data of at least a given size from the Link Layer device 22. On the receive interface 24, the polled PHY device asserts RPA 60 if it has a block of data, or a block containing an end of packet, to send to the Link Layer device 22. For both interfaces, the maximum block size is represented by Max-Transfer and depends on the application. For example, the system may set MaxTransfer to 52 bytes to accommodate 52-byte ATM cells or 256-byte packet fragments in certain packet applications. In general, the value of MaxTransfer is chosen to allow the system to operate in the most efficient manner. The value of MaxTransfer is fixed at start-up, either inherently in the device or by programming through an external management interface.

Figures 4, 5, 6:
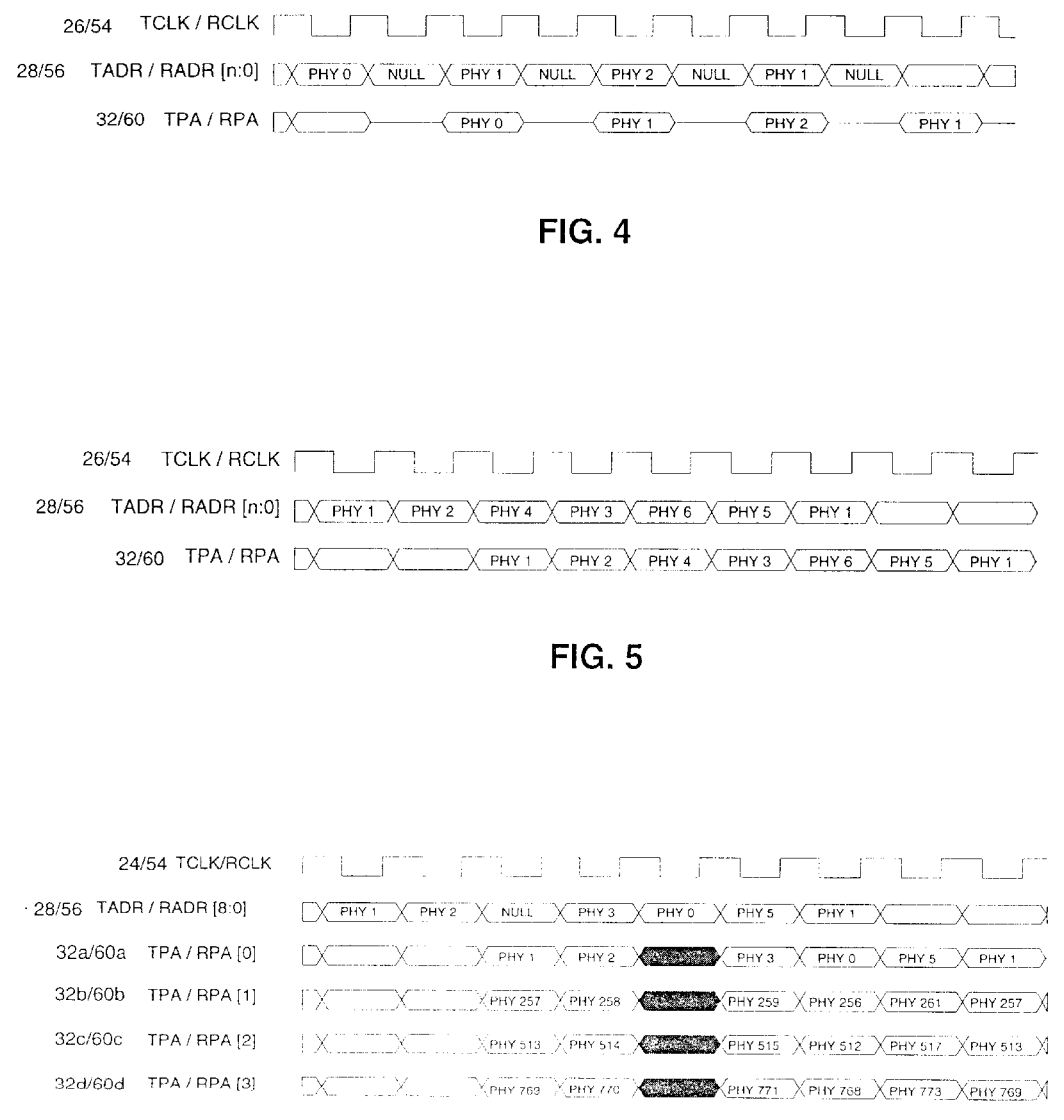

Referring to FIG. 4, the PHY devices do not respond to a NULL address. If TPA 32 or RPA 60 lines are shared among several PHY devices, the NULL address is inserted between valid PHY addresses to ensure that all PHY devices are tri-stated between cycles when TPA 32 or RPA 60 is driven.

Referring to FIG. 5, if the TPA 32 or RPA 60 lines are not shared, valid PHY addresses can be presented back-to-back without the need to insert NULL addresses.

Referring to FIG. 6, sample timing employing four PHY devices is shown. Multiple TPA 32 and RPA 60 lines may be used to support parallel polling.

On either the transmit interface 23 or the receive interface 24, the poll response from a PHY currently not selected shall refer to the packet available status of the PHY if it were to be selected at the next transfer period.

Figure 7:
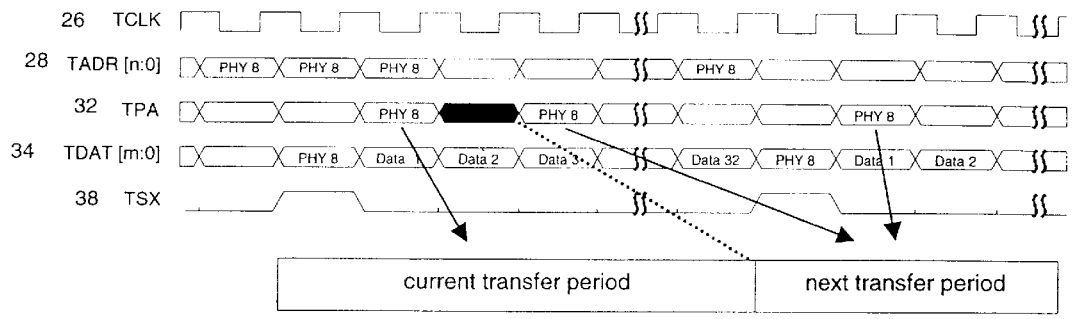
FIG. 7 is a timing diagram depicting the interpretation of the status of the Transfer Packet Available signal (TPA) for a selected PHY.

Referring to FIG. 7, on the transmit interface 23, the TPA poll response 32 from the selected PHY port is invalid if it corresponds to a TADR 28 poll to the selected port coincident with the start of transfer where TSX 38 is driven high. Poll responses of the selected PHY port to all corresponding polls coincident on all cycles after start of transfer but before the next start of transfer are valid and refer to the next transfer period.

Figure 8:
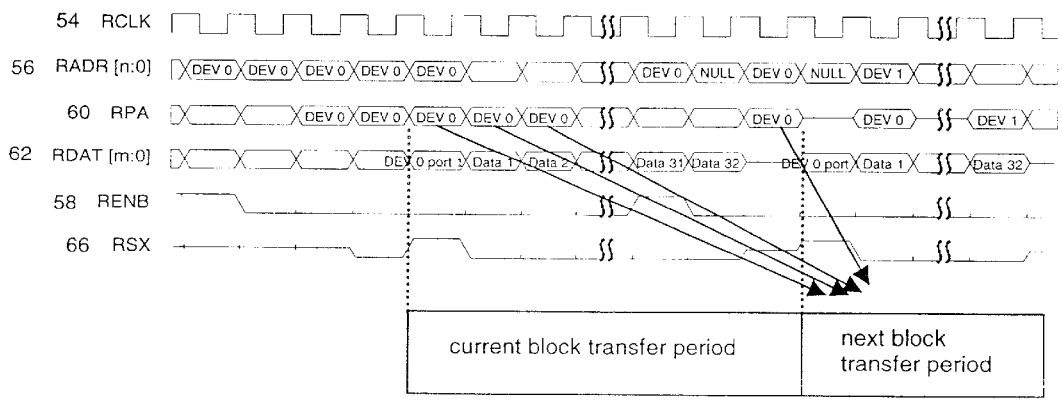
FIG. 8 is a timing diagram depicting the interpretation of the status of the Receive Packet Available signal (RPA) for a selected PHY.

Referring to FIG. 8, on the receive interface 24, when the RPA status 60 of a selected PHY shall refer to the next transfer period if it is coincident with the start of transfer (RSX 66 high) or any cycle thereafter within the current transfer period the status refers to the status of the next transfer period.

In either of the cases above (for a selected PHY, or a PHY not selected) described for the transmit interface 23 and the receive interface 24, the polled PHY returns a negative response (TPA 32/RPA 60 low) if the packet available status is uncertain.

Selection

The transmit interface 23 uses in-band PHY selection. To select a PHY, the Link Layer device 22 prepends the address of the selected PHY port to the transmitted data block on TDAT 34. In this way, polling is decoupled from selection, thereby allowing guaranteed and deterministic access to polling bandwidth over the transmit address lines and simplifying the implementation of polling and selection on the link layer device.

The Link Layer device 22 selects a PHY on the receive interface 24 by placing the corresponding PHY address on RADR 56 on the last cycle that RENB 58 is high. The selected PHY can begin a block transfer any time within the start window. The start window is from two to MAX cycles inclusive after RENB 58 goes low. The value of MAX is equal to MaxTransfer−3 where the value of MaxTransfer is set at start-up. For example, the block transfer in FIG. 8 starts 3 cycles after RENB 58 goes low. The use of a start window gives the PHY a margin of flexibility within which to respond with the block transfer after being selected. However, to maximize bus throughput efficiency, it is strongly recommended that the selected PHY begin block transmission as early as possible within the start window. If the selected PHY does not initiate a block transfer within the start window, the PHY deselects itself until explicitly selected again by the Link Layer device 22.

At the end of the transfer period, the selected PHY deselects itself and tri-states RDAT 62, RPRTY 64, RSX 66, RSOP 68, REOP 70, RMOD 72 and RERR 74. Only one PHY can be selected at any given time.

The Link Layer device 22 can pause the data transfer over the receive interface by holding RENB 58 high. The PHY device pauses two clock cycles after sampling RENB 58 high and resumes sending data two cycles after sampling RENB 58 low. The Link Layer device 22 does not need to explicitly reselect the PHY before the data transfer can resume. However, the Link Layer device 22 must ensure that another PHY has not been inadvertently selected when RENB 58 goes low. The Link Layer device 22 can preclude this possibility by placing either the NULL address or the selected PHY's address on RADR 56 on the last cycle that RENB 58 is high. Upon reasserting RENB 58 at the end of a paused transfer, the Link Layer device 22 must place either the NULL address or the selected PHY's address on the last cycle that RENB 58 is high.

At the receive interface 24, polling individual ports becomes an unwieldy task when the number of ports becomes exceedingly large. One solution is to use per-device polling and selection. Per-device polling and selection involves the PHY device acting as a proxy. The PHY device will assert RPA 60 if at least one of its constituent ports is ready to send a block of data. Next, the selected PHY device will select one of the ports that are ready to send a block of data to the Link Layer device 22. The PHY device prepends the address of the selected port to the data block in order to resolve the ambiguity of per-device polling and selection. The scheme for internal port selection is beyond the scope of this specification.

Both per-device polling and selection, and per-port polling and selection can co-exist in the same receive interface. A multi-port PHY that supports per-device selection will act as proxy for its ports when the device is polled or selected. Alternatively, if the PHY device recognizes individual port addresses, then per-port polling and selection may be implemented. For consistency with per-device polling, the selected PHY also prepends the selected port address in per-port polling. The Link Layer device 22 and the PHY devices must implement the necessary functions to support either per-device or per-port polling, but they do not have to implement the functions for both.

Data Transfer

Data is transferred to or from the PHY device in bursts referred to as data block transfer periods. A data block transfer period has a minimum length of 2 cycles and a maximum length of MaxTransfer+1 or MaxTransfer+2 cycles depending on the number of cycles used for the port address prepend. The value of MaxTransfer is set on start-up. In ATM applications, MaxTransfer is typically set to the length of an ATM cell, including extensions (if any) for prepends, postpends and UDF. A data block transfer period completes upon reaching either an end-of-packet or when MaxTransfer+1 cycles have been transferred. The length of a data block transfer period includes the port address prepend and the transfer of the payload data. The payload data may include prepends and postpends in extended ATM cells. On the transmit interface 23, transfers may be paused only in response to assertion of TRDY 52. On the receive interface 24, transfers may be paused by RENB 58. Cycles during which the data transfer has been paused do not count towards the length of the data block transfer period. At the end of the data block transfer period the selected PHY is deselected unless explicitly reselected by the Link Layer device 22.

The signals TSX 38 and RSX 66 mark the start of a block transfer period. TSX 38 and RSX 66 are asserted by the Link Layer device 22 and the PHY device respectively, during the first cycle of a data block transfer period and deasserted otherwise. The first cycle of a data block transfer period coincides with the port address prepend. Only one packet can occupy any given data block transfer period.

For the transmit direction (from the Link Layer device 22 to a PHY device), polling provides a suitable mechanism for the Link Layer device 22 to ascertain whether a PHY device has sufficient FIFO space to accept a block transfer. However, polling does not indicate whether processing overhead or other transient internal conditions may preclude the PHY from accepting a given block transfer. These conditions may arise when a burst of short packets, or packet completions, exceeds the PHY's packet processing capacity. To compensate for the limitations of polling, Any-PHY defines a signal TRDY 52 that allows the selected PHY device to pause a packet transfer from the Link Layer device. TRDY 52 is not defined for ATM cell transfer applications, as the maximum cell transfer rate is not expected to exceed the PHY's packet processing capacity.

When TRDY 52 is implemented, the selected PHY will drive TRDY 52 two cycles after TSX 38 is high. On the second cycle after TSX 38 is high, TRDY 52 is held low to pause the transfer or asserted high otherwise. The Link Layer device 22 pauses the data transfer two cycles after sampling TRDY 52 low and resumes transmission two cycles after sampling TRDY 52 high. TRDY 52 is output high for only one cycle and is tri-stated thereafter for the remainder of the data block transfer period. In order to avoid potential ambiguities with TRDY 52 during short back-to-back packets or short data block transfer periods, the Link Layer device 22 does not initiate a new data block transfer period within two cycles of sampling TRDY 52 high.

In order to utilize TRDY 52, the selected PHY device must be able to buffer two cycles of data and the Link Layer device 22 must be able to pause its transmit interface for as long as the PHY device holds TRDY 52 low. The Link Layer device 22 may implement a watchdog timer to detect unexpectedly long pauses. Further, the TRDY 52 handshake mechanism requires that data block transfer periods occupy at least four clock cycles.

As an alternative to TRDY 52, minimum gaps between data block transfer periods may be inserted so that the resulting packet stream will not overwhelm the PHY devices' packet processing capacity.

TSOP 40 and RSOP 68 are asserted to indicate the start of a cell or packet. TEOP 42 and REOP 70 are asserted to indicate the end of a packet. An end of a packet indicates the start of a packet on the next data block transfer period over the same PHY port therefore, TEOP 42 and REOP 70 can be utilized to mark packet boundaries. In applications where fixed-length packet transfers are completed in one block transfer period such as ATM cells, TSX 38 and RSX 66 can be utilized to mark both packet and data block transfer period boundaries. When a packet begins and ends in one clock cycle, the corresponding SOP and EOP signals are asserted on that same cycle.

In general, when EOP is asserted at the end of a packet, the MOD and ERR signals may also be asserted. For 32-bit wide data paths, TMOD 44 and RMOD 72 are two-bit values. For 16-bit wide data paths, TMOD 44 and RMOD 72 are asserted only if a packet does not end on a word boundary. For 8-bit wide data paths, TMOD 44 and RMOD 72 are not required. TERR 46 and RERR 74 are asserted to indicate an error condition associated with a packet transfer. Error conditions may arise when the FIFO overruns, the maximum packet length is violated, a bit error has occurred, an octet misalignment has occurred, a packet has been aborted or the minimum packet length is violated. When TERR 46 and RERR 74 are asserted high at the end of a packet, status information associated with the error condition is inserted by overwriting the last byte of TDAT[m:0] 34 and RDAT[m:0] 62 respectively, on the cycle that TERR 46 and RERR 74 is high. The format of the status information will be described later in this document.

EXAMPLES

Example 1

Figure 9:
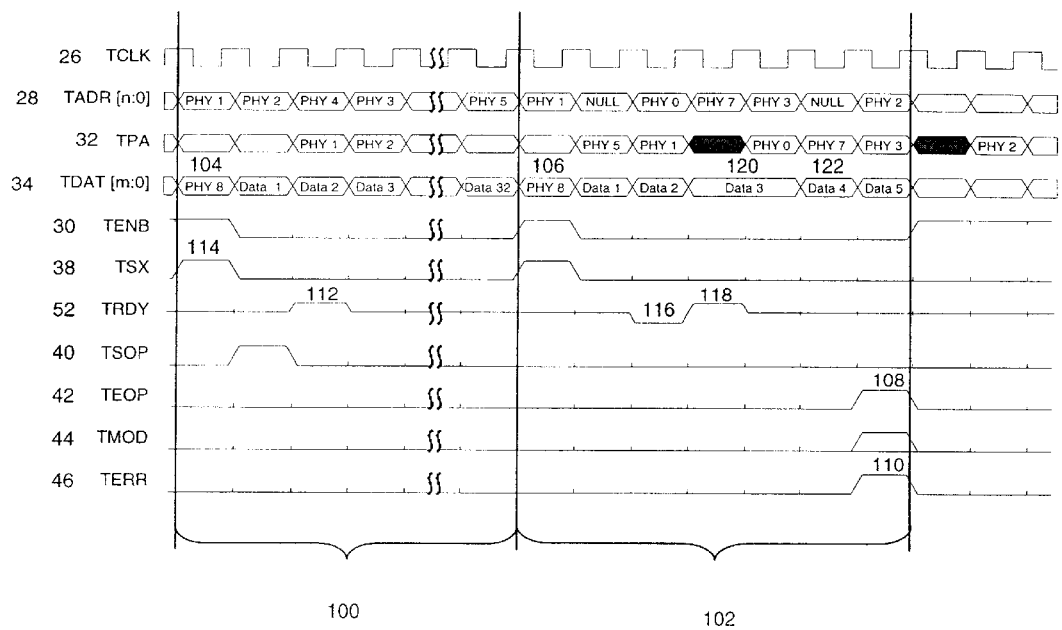
FIG. 9 is a timing diagram depicting sample timing for the basic operation of the transmit interface.

Referring to FIG. 9, the timing diagram for Example 1 demonstrates the operation of the transmit interface 23 as the Link Layer device 22 sending one data packet to PHY 8 in two data block transfer periods 100 and 102. Example 1 utilizes back-to-back polling, as the NULL address is not inserted between valid PHY addresses on TADR 28. The Link Layer device 22 is sending a data packet to the selected PHY device, PHY 8, while TADR 28 and TPA 32 operate to poll various PHY devices thereby demonstrating how polling operates independently from PHY selection and data transfer. MaxTransfer has been set to 32 cycles. Each of the transfer periods 100 and 102 begin with a prepended port address 104 and 106 respectively. The Link Layer device has detected an anomaly therefore TERR 46 is output high at 110, as TEOP goes high to signal the end-of-packet at 108. In the first transfer period of Example 1, the PHY 8 does not pause the transfer as TRDY 52 is asserted at 112, two cycles after TSX 38 is asserted at 114. During the second transfer period 102, the data transfer is paused as PHY 8 deasserts TRDY 52 for one cycle at 116, and asserts TRDY 52 high on the next cycle at 118. This pauses the data transfer on TDAT 34 at 120 for one cycle, two cycles after TRDY 52 is deasserted at 116. The data transfer resumes at 122, two cycles after TRDY 52 is asserted at 118.

Example 2

Figure 10:
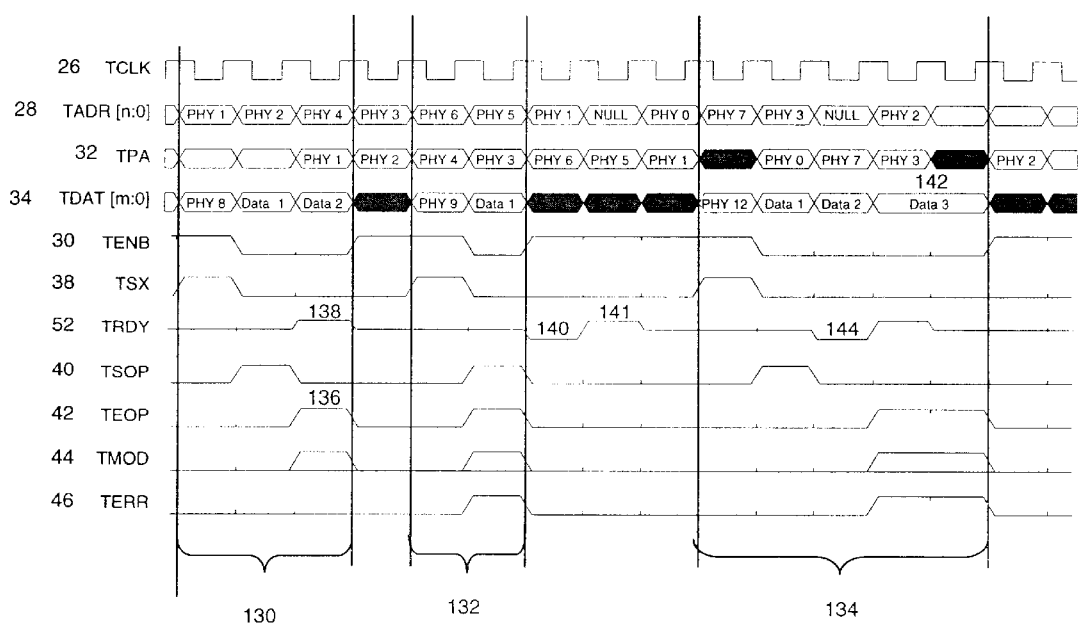
FIG. 10 is a timing diagram depicting sample timing for the transmission of short packets by the transmit interface.

Referring to FIG. 10, the timing diagram for Example 2 demonstrates the operation of the transmit interface 23 for three short packet transfers, one packet being transferred to each of PHYs 8, 9 and 12 during block transfer periods 130, 132 and 134 respectively. The transfer to PHY 8 during the first transfer period 130 transfers a two-cycle packet. As the transmission completes normally, TERR 46 is not asserted at the time TEOP is asserted on end-of-packet at 136. The transfer to PHY 9 during the second transfer period 132 cannot begin immediately after the end of transfer period 130 as a new transfer must wait at least two cycles after sampling TRDY 52 high as 138 in the previous transfer period 130. During the second transfer block period 132, the Link Layer device sends a one-cycle packet to PHY 9. Note that at 140, the selected PHY deasserts TRDY 52, but this has no effect on the transfer as the entire packet has already been sent. The transfer to PHY 12 during the third transfer period 134 again must wait at least two cycles after sampling TRDY 52 high at 141 in the previous transfer period 132. The Link Layer device 22 transfers a three-cycle packet to PHY 12 during the third transfer period 134. Note that the last cycle 142 is delayed in response to the deassertion of TRDY 52 at 144.

Example 3

Figure 11:
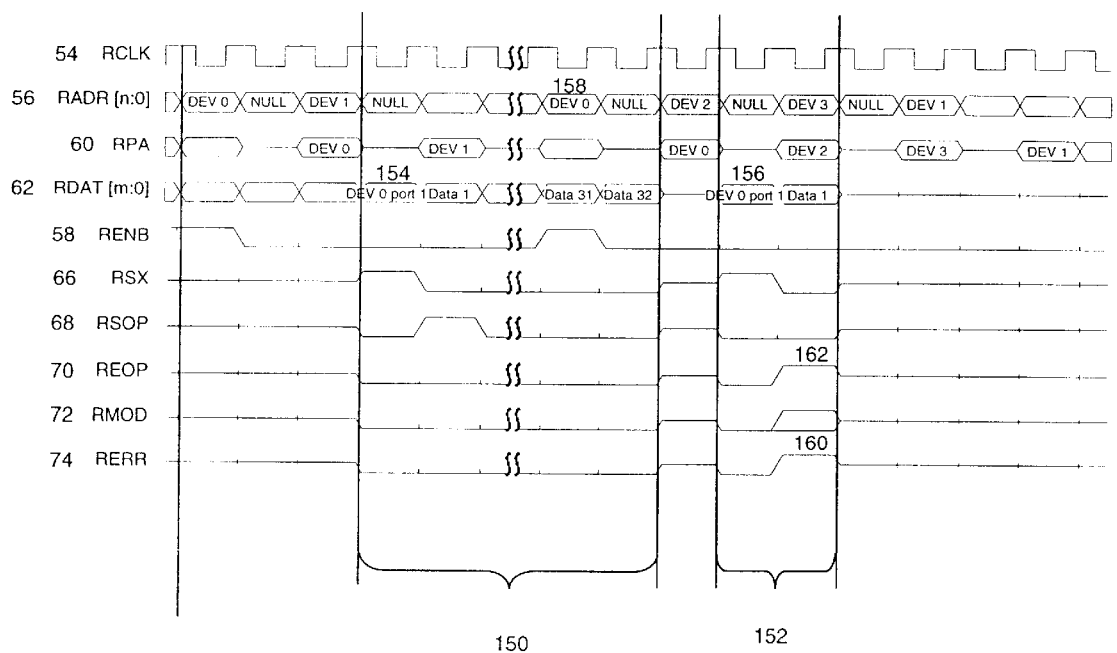
FIG. 11 is a timing diagram depicting sample timing for the basic operation of the receive interface with per-device selection.

Referring to FIG. 11, the timing diagram for Example 3 demonstrates the operation of the receive interface 24 as port 1 of PHY device 0 transfers a packet to the Link Layer device 22. In this example, the RPA lines 60 are shared among multiple PHY devices therefore back-to-back polling is not possible and a NULL address must be placed between valid PHY addresses on RADR 56. MaxTransfer is set to 32 cycles. During the first transfer period 150, PHY device 0 is selected, which selects port 1 and at 154, prepends the selected port's address on RDAT 62. At 158, the Link Layer device 22 reselects PHY device 0 one cycle before the end of the first transfer period by placing the address of PHY device 0 on RADR 56. Port 1 of PHY device 0 is selected again as the selected port's address is prepended on RDAT 62 at 156. During the second transfer period 152, the PHY device has detected an anomaly, and RERR 74 is asserted at 160 on end-of-packet signaled by the assertion of REOP 70 at 162. The selected PHY deselects itself at the end of the second transfer period 152 as it has not been reselected.

Example 4

Figure 12:
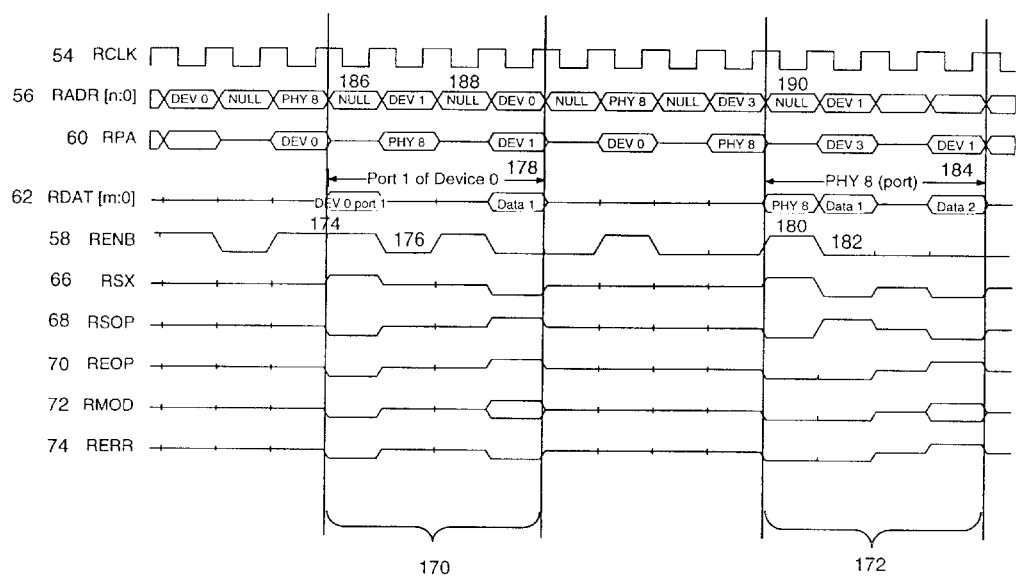
FIG. 12 is a timing diagram depicting sample timing for the basic operation of the receive interface with per-device selection and per-port selection and also showing paused transfers.

Referring to FIG. 12, the timing diagram for Example 4 demonstrates the operation of the receive interface 24 as per-device selection is used during the first transfer period 170 as Device 0 Port 1 is selected, and per-port selection is used during the second transfer period 172 as PHY 8 is selected. The Link Layer device 22 pauses the transfer from PHY device 0 by asserting RENB 58 high (for two cycles) at 174. The transfer pauses two cycles after sampling RENB 58 high at 174 and resumes the transfer two cycles after RENB 58 is sampled low at 176 resulting in the data transfer resuming at 178.

Similarly, the transfer from PHY 8 is paused two cycles after RENB 58 is asserted high at 180 and resumes at 184, two cycles after RENB 58 is sampled low at 182. The handshake mechanism used in Any-PHY is block-transfer oriented allowing the paused PHY to only wait for RENB to go low to resume the transfer and need not be explicitly reselected prior to continuation of the transfer period. The Link Layer device 22, however, must ensure that another PHY is not inadvertently selected when RENB 58 is reasserted. The Link Layer device 22 does this by placing either the NULL address or the selected PHY's address on RADR 56 on the last cycle that RENB 58 is high before RENB 58 is reasserted. During the first transfer period 170, at 186 and 188, the Link Layer device 22 puts the NULL address on RADR 56 to prevent another PHY from being selected.

At the end of the first and second transfer periods 170 and 172, the selected PHYs are automatically deselected.

Data Structure of Transfer Blocks

Data packets transferred over the transmit interface 23 or the receive interface 24 consist of a data block and an address prepend.

In FIGS. 13 to 16, the byte that may be overwritten is indicated by an asterisk.

Figure 13:
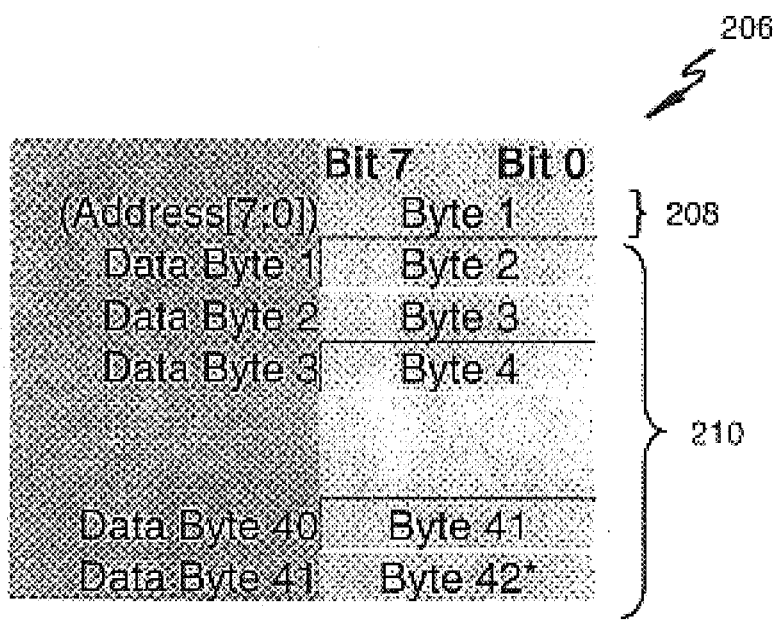
FIG. 13 depicts a data block with a 1-byte PHY address prepend for an 8-bit data path.
Figure 14:
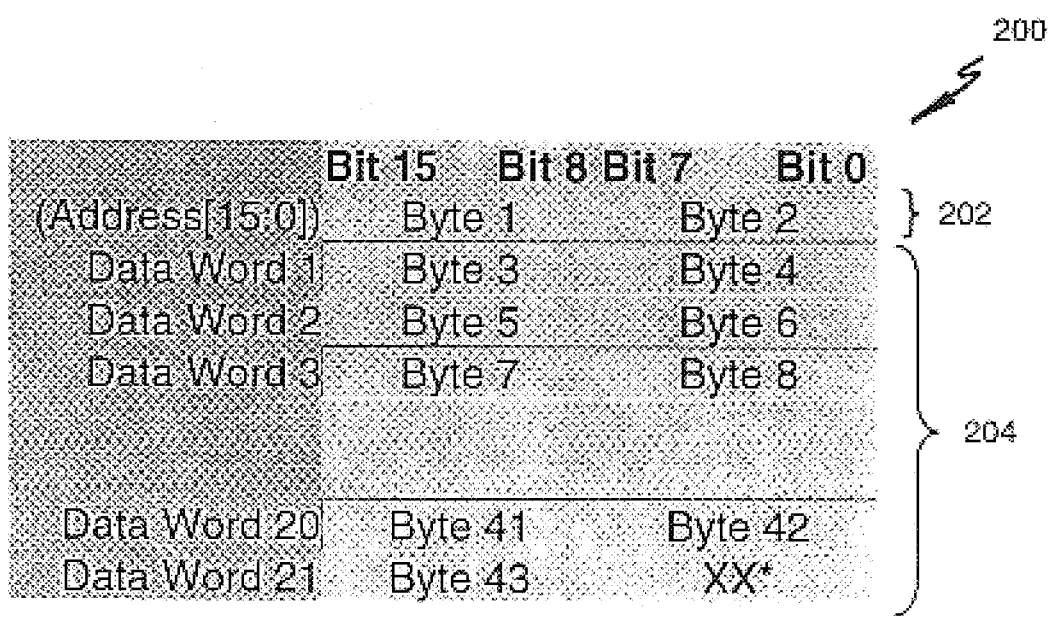
FIG. 14 depicts a data block with a 2-byte PHY address prepend for a 16-bit data path.
Figure 15:
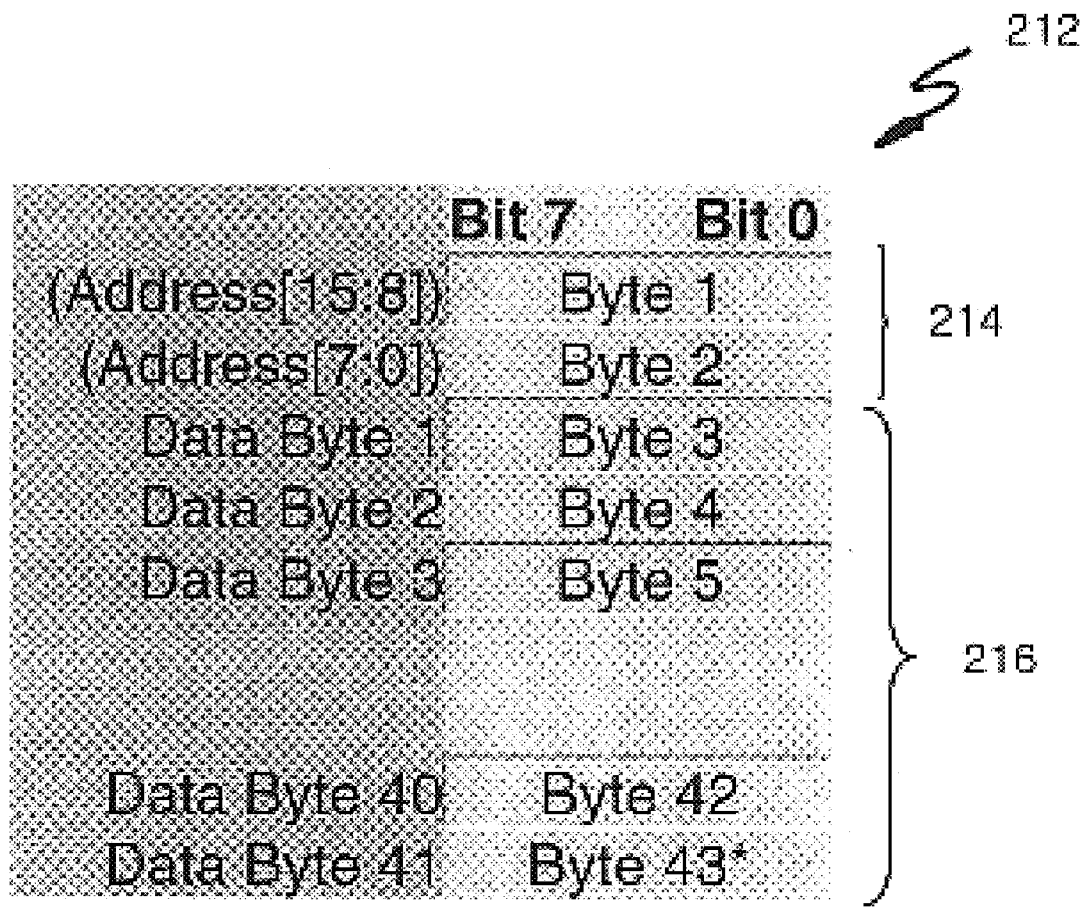
FIG. 15 depicts a data block with a 2-byte PHY address prepend for an 8-bit data path.
Figure 16:
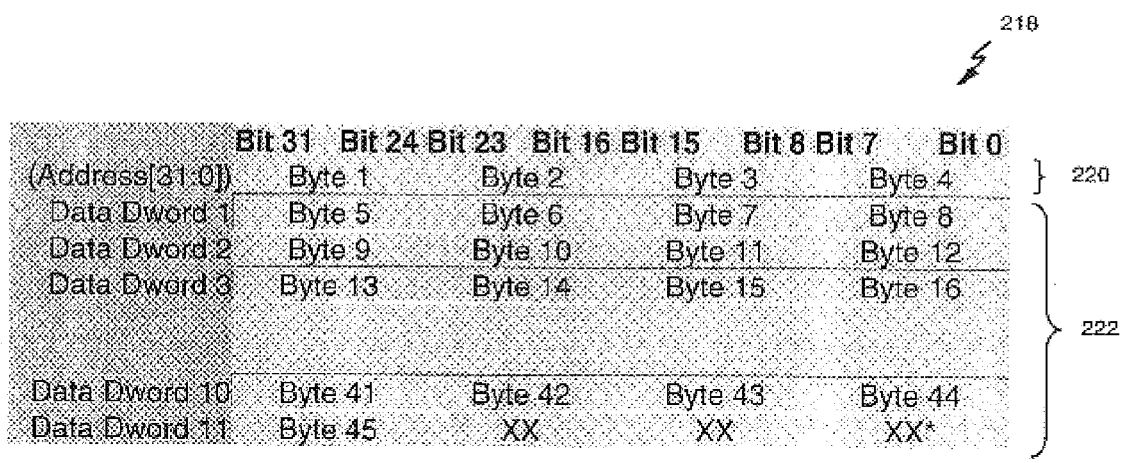
FIG. 16 depicts a data block with a 4-byte PHY address prepend for a 32-bit data path.

Referring to FIG. 13 the data packet 206 consists of a 41-byte data block 210 with a 1-byte address prepend 208 for an 8-bit wide data path. Referring to FIG. 14, the data packet 200 consists of a 41-byte data block 204 with a 2-byte address prepend 202 for a 16-bit wide data path. Referring to FIG. 15, the data packet 212 consists of a 41-byte data block 216 with a 2-byte address prepend 214 for an 8-bit wide data path. Referring to FIG. 16, the data packet 218 consists of a 41-byte data block 222 with a 4-byte address prepend 220 for a 32-bit wide data path. Data packets are transferred beginning with the highest-order bytes. Within a byte, the most significant bit is transmitted first. If an address spans more than one clock cycle in a block, it is sent with its most significant components first.

Applications which use an address-space smaller than that allocated for the prepend (e.g., a 12-bit address within a 2-byte prepend) shall pad the unused portion of the prepend with zeroes.

If the ERR signal is asserted the sending device may overwrite the least significant byte with status information on end of packet. In Table 5, the following bits in the status byte are defined with respect to particular error conditions.

TABLE 5

End-of-Packet Error Status Definitions.

| Bit | Definition |
|---|---|
| 0 | FIFO Overrun.<br>Set to 1 if a FIFO overflow occurred during packet transfer.<br>Set to 0 otherwise. |
| 1 | Maximum Packet Length Violation.<br>Set to 1 if the packet's length is greater than MaxPacketLen.<br>Set to 0 otherwise. |
| 2 | Bit Error Detected.<br>Set to 1 if bit error(s) have been detected in the packet (e.g., through CRC calculation)<br>Set to 0 otherwise. |
| 3 | Octet Aligninent.<br>Set to 1 if the transferred packet is not octet-aligned.<br>Set to 0 otherwise. |
| 4 | Abort.<br>Set to 1 if an abort has been issued for the transferred packet.<br>Set to 0 otherwise. |
| 5 | Minimum Packet Length Violation.<br>Set to 1 if the packet is shorter than MinPacketLen.<br>Set to 0 otherwise. |
| 6 | Reserved for future definitions. Set to 0. |
| 7 | Reserved for future definitions. Set to 0. |

Start-Up Parameters

Table 6 lists the parameters that must be set by the Layer device 22 and the PHY devices on start-up. The parameters may be set either by default or by programming through an external management interface. An asterisk (*) indicates an optional parameter. Tx and Rx prefixes refer to the transmit and receive interfaces respectively. The values of the parameters on the Link Layer device and the PHY devices must be consistent.

TABLE 6

Parameter Definitions.

| Label<br>(* = optional) | Definition |
|---|---|
| PHYAddrLen | Length of address prepend, in bits. |
| PHYSegBase<br>(0, . . . , MaxSegments-1) | Base address for a segment of ports in the PHY device.<br>Implemented in Level 2 compliant PHY devices.<br>MaxSegments corresponds to the maximum |

TABLE 6-continued

Parameter Definitions.

| Label<br>(* = optional) | Definition |
|---|---|
| | number of segments supported by the PHY device. |
| PHYSegSize | Implemented in Level 2 compliant PHY devices. |
| TXCS_enabled | Set to True if TADR[n] 28 functions as a Chip Select pin and set to False otherwise. |
| RxCS_enabled | Set to True if RADR[n] 56 functions as a Chip Select pin and set to False otherwise. |
| TxMaxTransfer,<br>RxMaxTransfer | Maximum number of cycles in a data block transfer period excluding the address prepend and pauses in the data transfer. Valid range: [1, finite value]. |
| TxMaxPacketLen*,<br>RxMaxPacketLen* | Maximum packet length, in bytes.<br>Valid range: [1, infinity]. |
| TxMinPacketLen*,<br>RxMinPacketLen* | Minimum packet length, in bytes.<br>Valid range: [1, finite value] |
| TxOverwriteEnabled,<br>RxOverwriteEnabled | Set to True if the least significant byte is overwritten with status information on end of packet when ERR is asserted and set to False otherwise. |

Signal Subset Designations for Any-PHY Compliance

To this point, all of the signals have been defined in general terms without reference to the requirements of particular applications utilizing the Any-PHY interface. Compliance to the Any-PHY interface specification requires the definition of two signal subsets, the Cell Subset and the Packet subset. The Cell Subset of signals is used to transfer cells, where cells are defined as fixed-length packets short enough to be completely transferred within a single data block transfer period. The Packet Subset of signals is used to transfer variable length packets. Within each of the two signal subsets, the signals are designated as mandatory, optional, not applicable, undefined or backward compatibility. Mandatory signals are those signals that must be implemented by all devices for all applications, without exception. Optional signals are application specific signal where each application may use only a select subset of the optional signals. Undefined and not applicable signals are those that either have no meaning or are not used in the context of the particular subset or application currently operating. Back compatibility signals are signals that may be used for multi-lingual operation with legacy interfaces such as POS-PHY Level 2. The Cell Subset and the Packet Subset of signals and their designations are listed in Table 7 below.

TABLE 7

Application-Specific Signal Subset Designations
(M = mandatory, O = optional, N/A = not applicable,
U = undefined, B = backward compatibility).

| Signal | Cell Subset | Packet Subset | Notes |
|---|---|---|---|
| TCLK,<br>RCLK | M | M | |
| TADR[n:0],<br>RADR[n:0] | M | M | TADR and RADR are n + 1 bits wide. |
| TCSB,<br>RCSB | U/O/M | U/O/M | TCSB and RCSB are indicated through TADR[n] and RADR[n] respectively.<br>TCSB and RCSB are not defined for Level 1 compliance.<br>TOSB and ROSB are mandatory |

TABLE 7-continued

Application-Specific Signal Subset Designations
(M = mandatory, O = optional, N/A = not applicable,
U = undefined, B = backward compatibility).

| Signal | Cell Subset | Packet Subset | Notes |
|---|---|---|---|
| | | | for Level 2 compliant PHY devices. TCSB and RCSB are optional for Level 2 compliant Link Layer devices. |
| TENB | O*, B** | O*, B** | *Optional for PHY devices. **Required at the Link Layer device for interoperation with Utopia and POS-PHY. |
| RENB | M | M | |
| TPA, RPA | M | M | |
| TDAT[m:0], RDAT[m:0] | M | M | TDAT and RDAT are m + 1 bits wide. |
| TPRTY, RPRTY | O | O | Used for error detection on TDAT[m:0] and RDAT[m:0]. |
| TSX, RSX | M | M | |
| TSOP, RSOP | B | B | Backward compatibility signals equivalent to TxSOC and RxSOC in Utopia L2, and to TSOP and RSOP in POS-PHY L2. |
| TEOP, REOP | N/A | M | Not required for transfer of (fixed-length) cells. |
| TMOD, RMOD | N/A | U (m <> 15) M (m = 15) | Not required for transfer of (fixed-length) cells. TDAT and RDAT width is m + 1 bits. |
| TMOD[1:0], RMOD[1:0] | N/A | U (m <> 31) M (m = 31) | Not required for transfer of (fixed-length) cells. TDAT and RDAT width is m + 1 bits. |
| TERR, RERR | O | O | Used for error status reporting on end of packet. |
| TRDY | N/A | O*, M** | Used for PHY-initiated block transfer pause on the transmit interface. * Optional for PHY device. **Mandatory for Link Layer device. |
| STPA, RVAL, DTPA[x], DRPA[x] | B | B | Backward compatibility signals used only with POS-PHY devices. |

Systems with Multiple Multi-Port PHY Devices

Systems with multiple multi-port PHY-devices refer to Any-PHY interfaces composed of multiple PHY devices, where each of the PHY Devices has multiple ports. The PHY devices need not all have the same number of ports.

Address Range

For 16-bit and 32-bit wide data paths, the Link Layer Device and the PHY devices can utilize a complete 16-bit address space to ensure unique in-band device and internal port identification across multiple PHY devices. A 16-bit address space allows up to 65535 ports to be uniquely identified. For an 8-bit wide data path, an 8-bit address space may be utilized to reduce port address prepend overhead in applications with limited addressing requirements.

Address Mapping

To allow the Any-PHY interface to more fully utilize its resources, the Any-PHY interface has the capability of efficiently mapping PHY port addresses to the flat internal address space of a Link Layer device. To perform this task, the PHY addresses are segmented at the device level, where a device's ports form a contiguous block that can be mapped along a subdivision of the address space that is a power-of-two greater than or equal to the block size of the internal PHY ports. This subdivision is referred to as a device-level segment.

Further, the PHY addresses may be segmented into several smaller contiguous blocks, in which the number of ports in a block is typically a power-of-two. Each block can then be mapped onto a finer range of subdivisions that are a power-of-two greater than or equal to the block size of the internal PHY ports. This subdivision is referred to as a mini-segment. Flat or unsegmented addressing refers to the situation where each mini-segment consists of one port. Mini-segmentation may allow much more efficient utilization of Link Layer Device resources over device-segmentation if the number of active ports is much less than the device segment size. The choice of the mini-segment size will depend on achieving a balance between efficient memory mapping, which favors smaller segment sizes and address decoding complexity, which favors larger segment sizes.

Mapping between mini-segments and the local PHY device address spaces can be implemented either at the PHY device or the Link Layer device. Mapping at the PHY device increases the implementation complexity of the PHY device and reduces the implementation complexity of the Link Layer device. If implemented, the address decoding circuitry must also be included in the PHY device, further increasing the implementation complexity.

In general, address mapping at the Link Layer device involves translation between its internal address space and a potentially large number of segmented address spaces. The segmented address spaces correspond to the attached PHY devices and may be different sizes. When mapping is done at the Link Layer device, unused gaps either within or between device segments may cause the address space required over the Any-PHY interface to exceed the Link Layer device's internal address space.

Number of Prepend Cycles

For 16-bit and 32-bit wide data paths, a single-cycle address prepend is preferred. For an 8-bit wide data path, an address prepend may span either one or two cycles. In system configurations which contain devices that can use either single or two-cycle prepends, the Link Layer and PHY devices must be configured to support either only single or two-cycle prepends across all devices. Utilizing a common prepend interval frees the Link Layer device from having to be aware of device-specific prepend lengths across its port address space thus reducing the implementation complexity of the Link Layer device.

Chip Select

In the preferred embodiment, all Any-PHY compliant PHY devices are capable of implementing the chip-select signals, TCSB and RCSB, in TADR[n] and RADR[n] respectively. The number of address signals (n+1) is chosen such that at $2^{n-1}$ is equal to at least the total number of PHY device's ports thereby allowing the PHY device's ports to be addressed through TADR[n−1:0] and RADR[n−1:0]. The implementation of the chip-select signals allows external decode logic to assist in PHY device and port address resolution over PHY devices with different port counts. 16-bit addressing is preferred when the chip-select signals are implemented.

Figure 17:
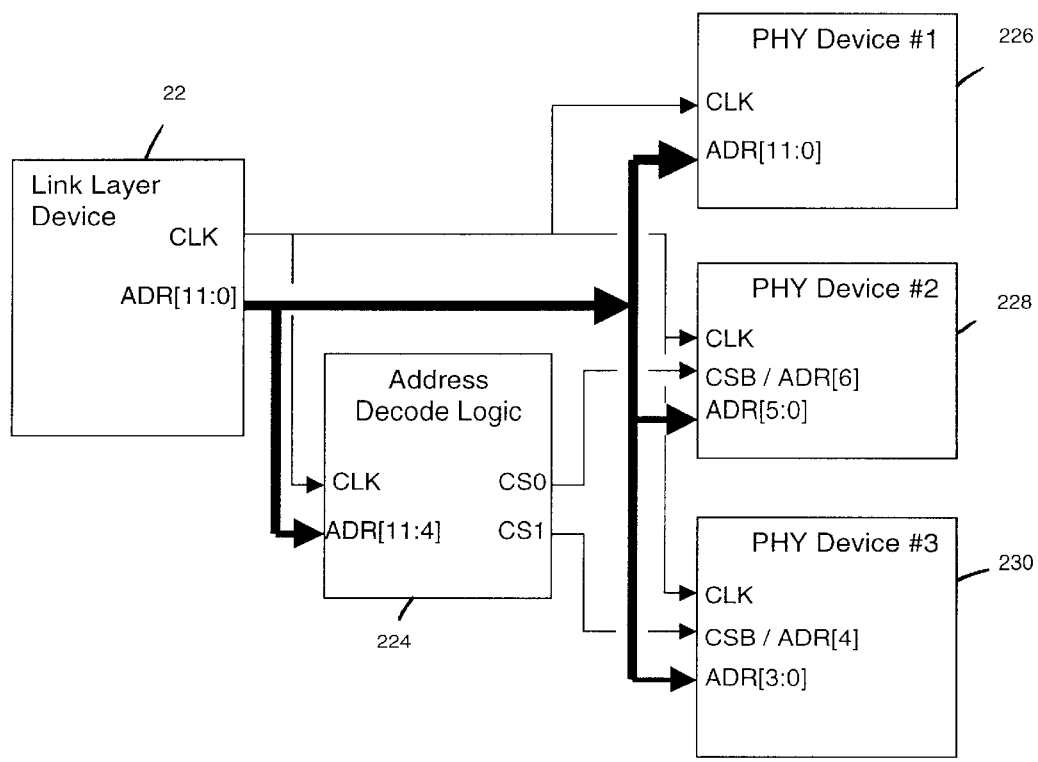
FIG. 17 is a schematic block diagram depicting a chip select and external address decoding topology.

Referring to FIG. 17, external address decode circuitry 224 in combination with the chip-select signals, facilitate the attachment of PHY devices with different address widths over the same Any-PHY interface. The external address decode circuitry is typically implemented in a small programmable logic device (PLD). Alternatively, the external address decode circuitry may be implemented internally within the Link Layer device. This allows the Link Layer Device to directly source the CSB signals. The internal implementation of the address decode circuitry limits the flexibility of the Link Layer device yet may be preferred for use with application-specific designs.

Any-PHY compatibility with Utopia and POS-PHY

On the transmit interface, for Any-PHY compliant devices to communicate with Utopia and POS-PHY compliant PHY devices, the Link Layer device must implement PHY selection via TENB and TADR[n:0]. When using POS-PHY devices, the signals STPA and DTPA[x] must be supported for operation in packet-level and byte-level transfer modes respectively. The signals TSX and TRDY are specific to Any-PHY and are not used in conjunction with Utopia and POS-PHY.

On the receive interface, PHY selection in Any-PHY is functionally analogous to that in Utopia and POS-PHY using the signals RENB and RADR[n:0]. When using POS-PHY devices, the DRPA[x] signal must be supported when byte-level transfer is used and the RVAL signal must be supported for both byte-level and packet-level transfer. The use of the signal RSX is specific to Any-PHY.

Multi-Lingual Operation

When implementing Utopia and POS-PHY Level 2 compliant devices on the Any-PHY interface, it must be taken into consideration that Utopia and POS-PHY devices are limited to 31 PHY addresses as they utilize 5-bit addressing, having the all 1's pattern reserved for NULL.

Polling

Poll responses across the TPA and RPA signal lines return one cycle earlier with Utopia and POS-PHY Level 2 than with Any-PHY. If the PHY devices share the TPA and RPA signals, NULL addresses must be inserted appropriately to account for the different response times. Table 8 summarizes the minimum number of NULL addresses that must be inserted for various conditions.

TABLE 8

Minimum Number of NULL Addresses to Insert Between Valid PHY Addresses.

| Polling Sequence | Minimum Number of NULL Addresses |
| --- | --- |
| Utopia/POS-PHY -> Any-PHY | 0 |
| Any-PHY/Utopia/POS-PHY -> same, or Utopia <-> POS-PHY | 1 |
| Any-PHY -> Utopia/POS-PHY | 2 |

Selection and Data Transfer

On the transmit interface, the Link Layer device selects a Utopia or POS-PHY compliant PHY by placing its corresponding address onto TADR[n:0] on the last cycle that TENB is high. For Utopia and POS-PHY, data transfer begins on the cycle that TENB goes low. By comparison, for Any-PHY TENB is high during the cycle containing the address prepend and low for the remainder of the transfer period.

On the receive interface, the PHY selection process for Utopia and POS-PHY operates in the same manner as Any-PHY. The Link Layer selects a PHY by placing the PHY's address on RADR[n:0] on the last cycle that RENB is high. For Utopia and POS-PHY devices, data transfer may begin on the cycle after RENB goes low. For Any-PHY, the two-cycle decode-response timing requires that the data transfer may begin only on the second cycle (or later) after RENB goes low.

In Utopia, the PHY remains selected at the completion of a cell transfer unless the PHY becomes explicitly disabled or another PHY has been selected. Furthermore, the Link Layer device may deselect a PHY that has not started cell transmission. However, if a PHY has started to send a cell while being deselected, the Link Layer device must reselect the PHY and allow the cell transmission to complete. POS-PHY behaves similarly to Utopia except that when a PHY's transmission ends with RVAL low, the PHY has essentially deselected itself. For Any-PHY, a PHY will always deselect itself at the end of a transfer period.

Co-existence of Any-PHY, POS-PHY and Utopia Level 2

Figure 18:
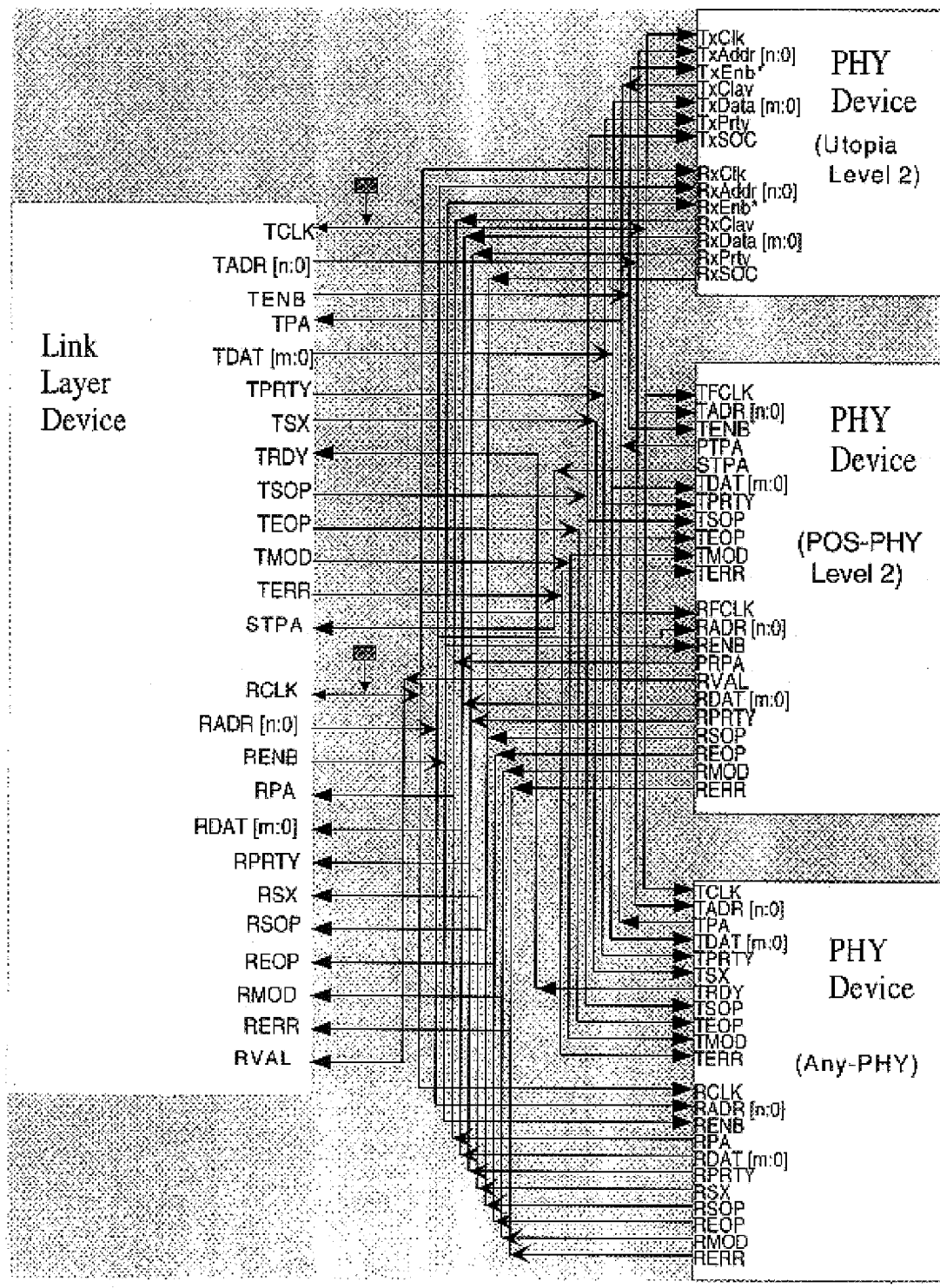
FIG. 18 is a schematic block diagram of the signal mapping between Any-PHY, Utopia Level 2 and POS-PHY Level 2.

When the necessary signals are supported and appropriately managed by an Any-PHY Link Layer device, Any-PHY, POS-PHY Level 2 and Utopia Level 2 compliant PHY devices can share the same bus. Referring to FIG. 18, the required signal connections between the Link Layer and the particular PHY devices are shown. Most of the signals are shared or common, however, the particular interfaces require some specific signals.

Figure 19:
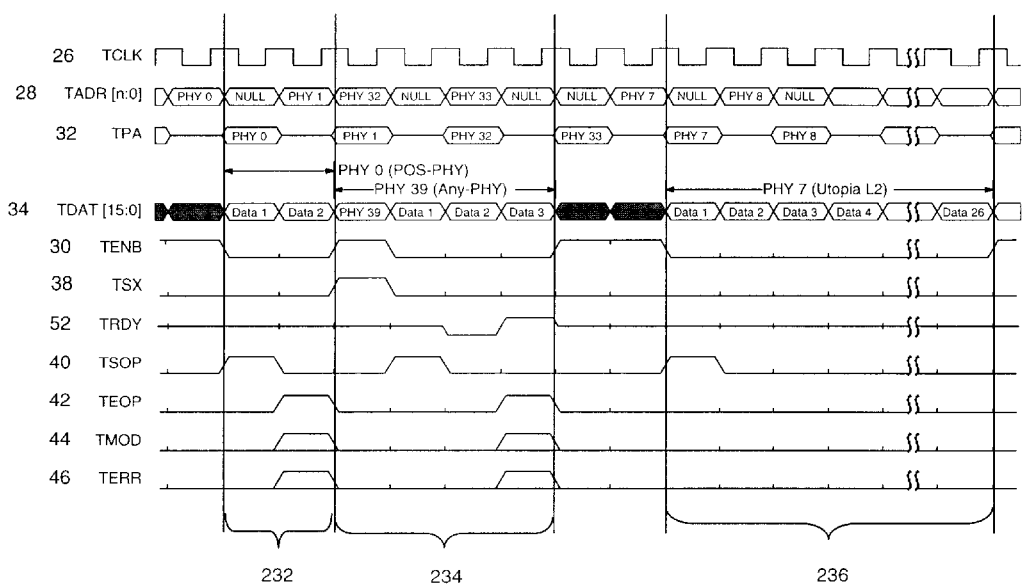
FIG. 19 is a timing diagram depicting sample timing for the basic operation of the transmit interface utilizing a multi-lingual link layer device.

Referring to FIG. 19, a sample timing diagram of the transmit interface depicting the basic operation of a data transfer from a multi-lingual Any-PHY Link Layer device to POS-PHY, Any-PHY and Utopia PHY devices sharing the same bus is shown. TENB 30 can be shared among all of the PHY devices in this example as the POS-PHY cell transfer 232 and Utopia cell transfer 236 are not being interrupted by the Any-PHY data transfer 234.

Figure 20:
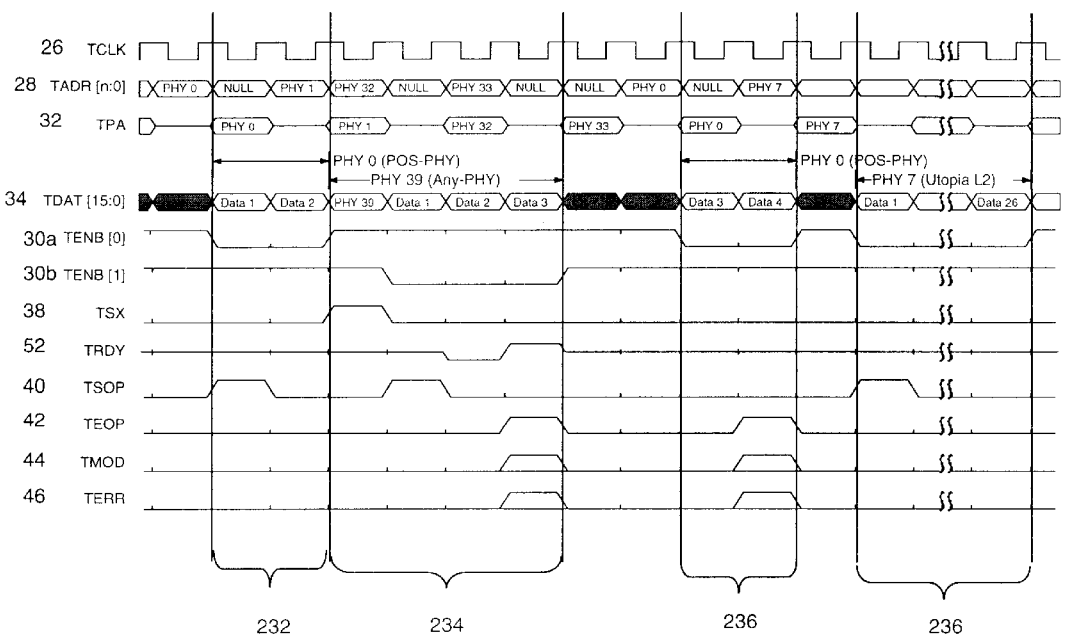
FIG. 20 is a timing diagram depicting sample timing for the transmit interface where a POS-PHY transfer is interrupted by an Any-PHY transfer from a multi-lingual link layer device to a PHY device.

Referring to FIG. 20, on the transmit interface, the POS-PHY data transfer 238 has been interrupted by the Any-PHY data transfer 240. The paused PHY must be reselected when TENB goes low again for the data transfer to continue at 242. This requirement may preclude sharing TENB between the POS-PHY and the Any-PHY devices. To accommodate all of the interfaces, TENB[0] 30*a* is shared by the POS-PHY and Utopia devices, while TENB[1] 30*b* is used only for Any-PHY devices.

Figure 21:
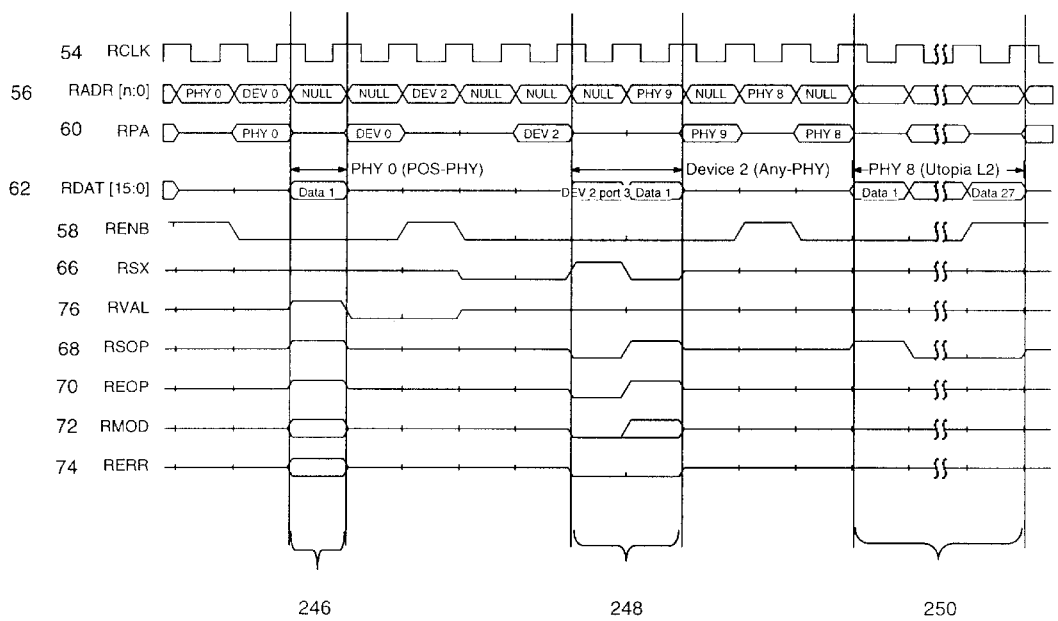
FIG. 21 is a timing diagram depicting sample timing for the basic operation of the receive interface utilizing a multi-lingual link layer device.

Referring to FIG. 21, on the receive interface, POS-PHY, Any-PHY and Utopia devices are selected sequentially. Each of the POS-PHY transfer 246, Any-PHY transfer 248 and Utopia L2 transfer 250 run to completion before the next device is selected. Under these conditions, RENB 58 can be shared by all of the PHY devices.

Figure 22:
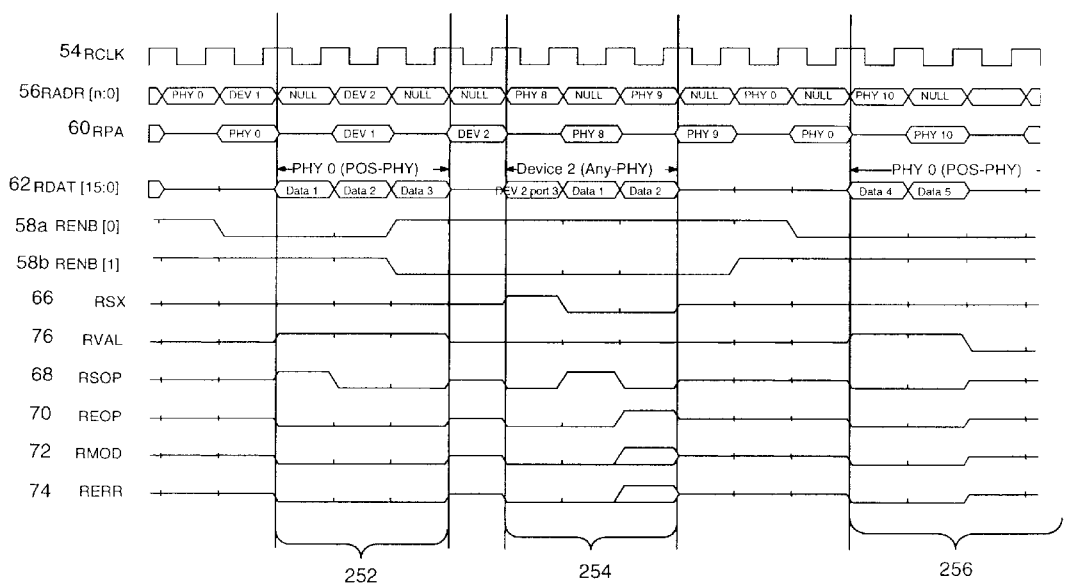
FIG. 22 is a timing diagram depicting sample timing for the receive interface where a POS-PHY transfer from a PHY device is interrupted by a multi-lingual link layer device to insert an Any-PHY transfer.

Referring to FIG. 22, on the receive interface, a POS-PHY transfer 252 is being interrupted by an Any-PHY transfer 254, and resuming at 256 after completion of the Any-PHY transfer 254. RENB[0] 58*a* is used with the POS-PHY device, while RENB[1] 58*b* is used with the Any-PHY device.

OC-48 Implications

The two-cycle decode-response delay in the Any-PHY interface relaxes timing requirements and makes it feasible for operation at clock frequencies required by OC-48 line rates where the clock runs at approximately 80–100 MHz for a 32-bit data path. Back-to-back pipelined polling is possible with the point-to-point connections typical in these high-speed interfaces.

ALTERNATE EMBODIMENTS

In an alternate embodiment, the data path width may be generalized to any arbitrary value. To accommodate a variety of path widths, the MOD signals (TMOD, RMOD) would be redefined or extended when the data path width was other than 16 or 32 bit. In the typical case where a path width is a multiple of 8, the MOD signals can be readily extended in the same manner as was done when moving from a 16-bit to a 32-bit wide data path.

In another alternate embodiment, the parity signals, TPRTY and RPRTY, are defined to implement even parity.

In another alternate embodiment, instead of implementing TRDY, the Layer device will shape block transfers over the transmit interface such that the peak block rate does not exceed the maximum packet processing rate of the target PHY device. The block transfer rates may be bounded either by implementing a minimum block length or by inserting a gap between contiguous block transfers.

In still another alternate embodiment, watchdog timers are implemented to reset the interface when TRDY is asserted for an unusually long period of time.

In still another alternate embodiment, when using point-to-point links such as a single PHY device only, an alternative handshake mechanism is used over the receive interface where a PHY need not deselect itself after completing a block transfer over the receive interface. The Layer device no longer polls nor selects either the PHY ports or the PHY device. RADR[n:0] are not used and RENB is used only to pause data transfer from the PHY device.

The above-described embodiments should be regarded as illustrative rather than restrictive, and it should be appreciated that variations may be made other than those discussed, by workers of ordinary skill in the art without departing from the scope of the present invention as defined by the following claims.

What is claimed is:
1. A bus interface for exchanging data blocks within a communications system between a PHY and a Link Layer device, said PHY having:
   i) a transmit interface wherein said transmit interface is electrically coupled to said link layer device over said bus interface;
   ii) a receive interface wherein said receive interface is electrically coupled to said link layer device over said bus interface;
   iii) a transmit ready signal generator operative to generate a transmit ready signal wherein asserting said transmit ready signal pauses a transfer of said data blocks from said link layer device to said PHY;
   iv) a start of transfer signal generator operative to generate a start of transfer signal wherein asserting said start of transfer signal indicates a first data block of an exchange of said data blocks;
   v) an end of packet signal generator operative to generate an end of packet signal wherein asserting said end of packet signal indicates a last data block of an exchange of said data blocks;
   vi) a chip select signal generator operative to generate a chip select signal wherein said chip select signal indicates the selection of a PHY device or a PHY port of said PHY; and
said link layer device having:
   i) a transmit interface wherein said transmit interface is electrically coupled to said PHY over said bus interface;
   ii) a receive interface wherein said receive interface is electrically coupled to said PHY over said bus interface;
   iii) a transmit ready signal generator operative to generate a transmit ready signal wherein asserting said transmit ready signal pauses a transfer of said data blocks from said link layer device to said PHY;
   iv) a start of transfer signal generator operative to generate a start of transfer signal wherein asserting said start of transfer signal indicates a first data block of an exchange of said data blocks;
   v) an end of packet signal generator operative to generate an end of packet signal wherein asserting said end of packet signal indicates a last data block of an exchange of said data blocks.

2. The bus interface according to claim 1, wherein said bus interface operates synchronously with a clock signal.

3. The bus interface according to claim 1, wherein said data blocks transferred to said PHY each include a data packet and an address prepended to said data packet so as to decouple polling and selection of said PHY on said transmit interface.

4. The bus interface according to claim 1, wherein said data blocks transferred to said PHY each include a data packet and an address prepended to said data packet so as to allow per-device polling on said receive interface.

5. The bus interface according to claim 3, wherein said data packet is of variable length.

6. The bus interface according to claim 3, wherein said data packet has a fixed length.

7. The bus interface according to claim 4, wherein said data packet is of variable length.

8. The bus interface according to claim 4, wherein said data packet has a fixed length.

9. The bus interface according to claim 1, wherein said PHY has a plurality of ports.

10. The bus interface according to claim 1, said Link Layer device including a receive enable signal generator wherein asserting said receive enable signal pauses the transfer of data blocks from said PHY to said link layer device.

11. The bus interface according to claim 1, further including an error signal generator operative to generate an error signal wherein a least significant byte of said last data block is overwritten with error information when said error signal is asserted.

12. A bus interface for exchanging data blocks within a communications system between a plurality of PHYs and a Link Layer device, each of said PHYs having:
   i) a transmit interface wherein said transmit interface is electrically coupled to said link layer device over said bus interface;
   ii) a receive interface wherein said receive interface is electrically coupled to said link layer device over said bus interface;
   iii) a transmit ready signal generator operative to generate a transmit ready signal wherein asserting said transmit ready signal pauses a transfer of said data blocks from said link layer device to a selected one of said PHYs;
   iv) a start of transfer signal generator operative to generate a start of transfer signal wherein asserting said start of transfer signal indicates a first data block of an exchange of said data blocks;
   v) an end of packet signal generator operative to generate an end of packet signal wherein asserting said end of packet signal indicates a last data block of an exchange of said data blocks;
   vi) a chip select generator operative to generate a chip select signal wherein said chip select signal indicates the selection of a PHY device or a PHY port of a selected one of said PHYs; and
said link layer device having:
   i) a transmit interface wherein said transmit interface is electrically coupled to said PHYs over said bus interface;
   ii) a receive interface wherein said receive interface is electrically coupled to said PHYs over said bus interface;
   iii) a transmit ready signal generator operative to generate a transmit ready signal wherein asserting said transmit ready signal pauses a transfer of said data blocks from said link layer device to a selected one of said PHYs;

iv) a start of transfer signal generator operative to generate a start of transfer signal wherein asserting said start of transfer signal indicates a first data block of an exchange of said data blocks;

v) an end of packet signal generator operative to generate an end of packet signal wherein asserting said end of packet signal indicates a last data block of an exchange of said data blocks.

13. The bus interface according to claim 12, wherein said bus interface operates synchronously with a clock signal.

14. The bus interface according to claim 12, wherein a point to multi-point topology is used over a common one of said bus interface.

15. The bus interface according to claim 12, wherein a point to point topology is used wherein each of said PHYs has an exclusive bus interface.

16. The bus interface according to claim 12, wherein said data blocks transferred to said selected one of said PHYs each include a data packet and an address prepended to said data packet so as to decouple polling and selection of said selected one of said PHYs on said transmit interface.

17. The bus interface according to claim 12, wherein said data blocks transferred to said selected one of said PHYs each include a data packet and an address prepended to said data packet so as to allow per-device polling on said receive interface.

18. The bus interface according to claim 17, wherein said data packet is of variable length.

19. The bus interface according to claim 17, wherein said data packet has a fixed length.

20. The bus interface according to claim 16, wherein said data packet is of variable length.

21. The bus interface according to claim 16, wherein said data packet has a fixed length.

22. The bus interface according to claim 12, wherein at least one of said PHYs has a plurality of ports.

23. The bus interface according to claim 12, said Link Layer device including a receive enable signal generator wherein asserting said receive enable signal pauses the transfer of data blocks from a selected one of said PHYs to said link layer device.

24. The bus interface according to claim 12, further including an error signal generator operative to generate an error signal wherein a least significant byte of said last data block is overwritten with error information when said error signal is asserted.

25. A method of exchanging data blocks between a link layer device and a PHY across a bus interface having a transmit interface and a receive interface, comprising:

a) causing said link layer device to poll said PHY;
b) causing said PHY to respond to said link layer device;
c) causing said link layer device to select said PHY;
d) causing data blocks to be exchanged between said link layer device and said PHY; and
e) causing said PHY to deselect itself.

26. The method according to claim 25, wherein step a) includes:

i) causing said link layer device to present the address of said PHY over an address line;
ii) causing said PHY to respond two cycles later;
iii) causing said PHY to assert packet available when data blocks are available to be exchanged.

27. The method according to claim 26, further including the steps of pausing the exchange of data blocks on the transmit interface by holding the transmit enable signal high and resuming the exchange of data blocks on the transmit interface when the transmit enable signal is held low.

28. The method according to claim 26, further including the steps of pausing the exchange of data blocks on the receive interface two cycles after sampling the receive enable signal high and resuming the exchange of data on the receive interface blocks two cycles after sampling said receive enable signal low.

29. The method according to claim 25, wherein step c) on the transmit interface includes prepending the address of said PHY to a data packet to be transmitted.

30. The method according to claim 25, wherein step c) on the receive interface first requires said PHY to select a port on said PHY and prepending an address for said port to a data block to be transmitted.

31. The method according to claim 25, wherein step d) on said transmit interface includes:

i) asserting the start of transfer signal to indicate the first cycle of a transfer; and
ii) asserting the end of packet signal to indicate the cycle containing the end of packet.

32. The method according to claim 25, wherein step d) on said receive interface includes:

i) asserting a receive enable signal low;
ii) asserting a start of transfer signal to indicate a first cycle of a transfer wherein said start of transfer signal is asserted X cycles after step i) and X is a whole positive integer greater than or equal to two (2) and less than or equal to the maximum size of a block transfer minus three (3);
iii) asserting a start of transfer signal to indicate a first cycle of a transfer; and
iv) asserting an end of packet signal to indicate a cycle containing an end of packet.

33. A method of exchanging data blocks between a link layer device and a plurality of PHYs across a bus interface comprising:

a) causing said link layer device to poll said PHYs;
b) causing said PHYs to respond to said link layer device;
c) causing said link layer device to select one of said PHYs;
d) exchanging data blocks between said link layer device and said selected one of said PHYs; and
e) causing said selected one of said PHYs to deselect itself.

34. The method according to claim 33, wherein said polling is back-to-back polling.

35. The method according to claim 33, wherein at least one of said PHYs has a plurality of ports.

36. The method according to claim 33, wherein step a) includes:

a) causing said link layer device to present the address of each of said PHYs over the address line; and
b) causing each of said PHYs to respond two cycles later; and
c) causing each of said PHYs to assert packet available when data blocks are available to be exchanged.

37. The method according to claim 33, wherein step a) further includes placing the NULL address between each address of each of said PHYs presented on the address line.

38. The method according to claim 33, wherein step c) on the transmit interface includes prepending the address of a selected one of said PHYs to a data packet to be transmitted.

39. The method according to claim 33, wherein step c) on the receive interface first requires said selected one of said PHYs to select a port on said selected PHY and prepending an address for said port to a data block to be transmitted.

40. The method according to claim 33, wherein step d) on said transmit interface includes:
  i) asserting the start of transfer signal to indicate the first cycle of a transfer; and
  ii) asserting the end of packet signal to indicate the cycle containing the end of packet.

41. The method according to claim 33, wherein step d) on said receive interface includes:
  i) asserting a receive enable signal low;
  ii) asserting a start of transfer signal to indicate a first cycle of a transfer wherein said start of transfer signal is asserted X cycles after step i) and X is a whole positive integer greater than or equal to two (2) and less than or equal to the maximum size of a block transfer minus three (3);
  iii) asserting a start of transfer signal to indicate a first cycle of a transfer; and
  iv) asserting an end of packet signal to indicate a cycle containing an end of packet.

42. The method according to claim 33, further including the steps of pausing the exchange of data blocks on the transmit interface by holding the transmit enable signal high and resuming the exchange of data blocks on the transmit interface when the transmit enable signal is held low.

43. The method according to claim 33, further including the steps of pausing the exchange of data blocks on the receive interface two cycles after sampling the receive enable signal high and resuming the exchange of data blocks on the receive interface two cycles after sampling said receive enable signal low.

* * * * *

UNITED STATES PATENT AND TRADEMARK OFFICE
CERTIFICATE OF CORRECTION

PATENT NO. : 6,671,758 B1  Page 1 of 1
DATED : December 30, 2003
INVENTOR(S) : Cam et al.

It is certified that error appears in the above-identified patent and that said Letters Patent is hereby corrected as shown below:

Column 17,
Line 36, change "Algninent", to -- Alignment --.
Line 48, before "Layer", insert -- Link --.

Column 18,
Line 9, insert the sentence -- Size, in bytes, of each segment in the PHY device. --
Line 66, change "TOSB" to -- TCSB -- and "ROSB" to -- RCSB --

Signed and Sealed this

Seventeenth Day of August, 2004

JON W. DUDAS
*Acting Director of the United States Patent and Trademark Office*